(12) United States Patent  
Wang et al.

(10) Patent No.: US 10,623,988 B2  
(45) Date of Patent: Apr. 14, 2020

(54) ACTIVATION AND DEACTIVATION OF MULTIPLICATION TRANSMISSION

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Luleå (SE); Hans Hannu, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/553,038

(22) PCT Filed: Jun. 15, 2017

(86) PCT No.: PCT/SE2017/050638  
§ 371 (c)(1),  
(2) Date: Aug. 23, 2017

(87) PCT Pub. No.: WO2018/084760  
PCT Pub. Date: May 11, 2018

(65) Prior Publication Data  
US 2018/0279169 A1 Sep. 27, 2018

Related U.S. Application Data

(60) Provisional application No. 62/417,455, filed on Nov. 4, 2016.

(51) Int. Cl.  
*H04W 28/06* (2009.01)  
*H04L 1/00* (2006.01)  
(Continued)

(52) U.S. Cl.  
CPC .......... *H04W 28/06* (2013.01); *H04L 1/0025* (2013.01); *H04L 1/08* (2013.01); *H04L 1/1809* (2013.01);  
(Continued)

(58) Field of Classification Search  
CPC ........ H04W 28/06; H04W 24/02; H04L 1/08; H04L 1/1809  
(Continued)

(56) References Cited

U.S. PATENT DOCUMENTS

2012/0140689 A1* 6/2012 Pelletier ................ H04L 5/0005  
370/311  
2014/0189470 A1* 7/2014 Hwang ................. H04L 1/0061  
714/776  
(Continued)

FOREIGN PATENT DOCUMENTS

EP 0920230 A1 6/1999  
WO 2006089456 A1 8/2006  
(Continued)

OTHER PUBLICATIONS

"Repetition/TTI Length Switching Design Issues", 3GPP TSG-RAN WG1 Meeting #56bis, R1-091555, XP050339112, Nokia Siemens Networks, Nokia, Seoul, Korea, Mar. 23-27, 2009, pp. 1-4.  
(Continued)

*Primary Examiner* — Christopher R Crompton  
(74) *Attorney, Agent, or Firm* — Murphy, Bilak & Homiller, PLLC

(57) ABSTRACT

Disclosed are methods, devices and computer programs that enables a controlled activation and/or deactivation of multiplication/duplication transmissions where packets transmitted to a wireless device from a network node is multiplied/duplicated and transmitted from several network nodes to the wireless device. The methods, devices and computer  
(Continued)

programs are based on a quality indication that represents for the quality of the connections between a wireless device and different network units. Based on a quality indication obtained from the wireless device the network node(s) may initiate or terminate a multiplication/duplication transmission mode where packets are transmitted to the wireless device from several network nodes.

11 Claims, 21 Drawing Sheets

(51) Int. Cl.
  *H04L 1/08* (2006.01)
  *H04L 1/20* (2006.01)
  *H04L 1/18* (2006.01)
  *H04W 24/02* (2009.01)
  *H04W 36/00* (2009.01)

(52) U.S. Cl.
  CPC ............... *H04L 1/20* (2013.01); *H04W 24/02* (2013.01); *H04L 1/0019* (2013.01); *H04L 1/1812* (2013.01); *H04W 36/0069* (2018.08)

(58) Field of Classification Search
  USPC .......................................................... 370/328
  See application file for complete search history.

(56) References Cited

U.S. PATENT DOCUMENTS

| | | |
|---|---|---|
| 2015/0326456 A1 | 11/2015 | Dudda et al. |
| 2016/0150586 A1 | 5/2016 | Lei et al. |
| 2016/0164793 A1 | 6/2016 | Basu Mallick et al. |
| 2016/0302198 A1* | 10/2016 | Lee ........................ H04L 1/1861 |
| 2017/0164252 A1* | 6/2017 | Chaudhuri ............ H04L 5/0035 |
| 2017/0171771 A1 | 6/2017 | Jung et al. |
| 2017/0347063 A1* | 11/2017 | Singh ..................... H04N 7/147 |
| 2018/0227219 A1 | 8/2018 | Zhang et al. |

FOREIGN PATENT DOCUMENTS

| | | |
|---|---|---|
| WO | 2015026272 A1 | 2/2015 |
| WO | 2017207052 A1 | 12/2017 |

OTHER PUBLICATIONS

Unknown, Author, "Dual Connectivity based link switch between LTE and NR", 3GPP TSG-RAN WG2 #95, Tdoc R2-165330, Gothenburg, Sweden, Aug. 22-26, 2016, 1-3.

Unknown, Author, "Response to LS on uplink transmission gap in NB-IoT", 3GPP TSG RAN WG2 Meeting #94, R4-164459, Nanjing, China, May 23-27, 2016, 1-1.

Unknown, Author, "Tight integration of NR and LTE: User Plane design", 3GPP TSG-RAN WG2 #94, Tdoc R2-164027, Nanjing, P.R. China, May 23-27, 2016, 1-4.

Unknown, Author, "UP aspects of Upper layer aggregation (DC like) for multi-connectivity", 3GPP TSG-RAN WG2 #96, Tdoc R2-168670, Reno, Nevada, Nov. 14-18, 2016, 1-4.

Cena, Gianluca et al., "An Enhanced MAC to Increase Reliability in Redundant Wi-Fi Networks", 2014 10th IEEE Workshop on Factory Communication Systems (WFCS 2014), IEEE, XP032608485, May 5, 2014, pp. 1-10.

Unknown, Author , "Draft Report of 3GPP TSG RAN WG6 Meeting #1", held in Gothenburg, Sweden, R6-160212, ETSI MCC, Reno, USA, Aug. 22-16, 2016, 57 pages.

Unknown, Author , "Energy Efficient Hybrid TA/OTD Multilateration for Neighbour Cells in Extended Coverage", 3GPP TSG RAN WG6 Meeting #1, R6-160035, Nokia, Gothenburg, Sweden, Aug. 22-26, 2016, 11 pages.

Unknown, Author , "Multilateration Signaling for GERAN", RAN WG6 Meeting #1, R6-160018, LM Ericsson, Gothenburg, Sweden, Aug. 22-26, 2016, 11 pages.

* cited by examiner

IADT = INFORMATION TO ENABLE AN ACTIVATION OF DUPLICATION TRANSMISSION

TDP = TRANSMISSION OF DUPLICATED PACKETS

ACTIVATION AND DEACTIVATION OF MULTIPLICATION TRANSMISSION

TECHNICAL FIELD

The proposed technology generally relates to wireless communication systems operating based on multi/dual connectivity, and more specifically to methods and devices, and corresponding computer programs and apparatuses, that enables activation and deactivation of packet multiplication/duplication transmissions.

BACKGROUND 5G is expected to operate in a wide range of frequency bands, probably using also very high frequency bands compared to 4G. This implies, for example, lower diffraction and higher outdoor-to-indoor penetration losses, which means that signals will have more difficulties to propagate around corners and penetrate walls. Also, the initial deployment of 5G will be rather spotty.

The state-of-the-art integration between two different Radio Access Technologies, RATs, is hard handover, see e.g. Ref. 3GPP15-36300. The major drawbacks with inter-RAT hard handover, e.g. between 3G and 4G are the rather long delay and service interruption as well as the low reliability. A tighter integration with evolved Long Term Evolution, evolved LTE, may therefore be crucial in order to ensure ultra-high reliability and extreme bit rates in a 5G system.

One alternative is to use a solution similar to 5G dual connectivity, i.e. both User Plane, UP, and Control Plane, CP, are connected to both LTE and 5G and the UP data is aggregated, or split, at PDCP layer. Typically, this means the bearer split option referred to in the art as 3C, i.e. the bearer is split in the master eNB at Packet Data Convergence Protocol layer, PDCP layer. Dual connectivity increases the user throughput, due to UP aggregation, especially at low load and increases the reliability, due to CP diversity.

However, Dual Connectivity, DC, does not increase the coverage of the user plane data unlike solutions such as Coordinated Multi Point, CoMP, soft handover and multi-flow. All these solutions transmit the same UP data over all links and thereby increases the coverage. CoMP and Soft handover rely on a synchronized transmission, and reception, and maximum ratio combining, MRC, of the symbols. However, for LTE and 5G, sometimes referred to as New Radio, NR, this can be very difficult due to different transport formats, pilots, waveforms, numerology etc. Also, both CoMP and soft handover requires very good backhaul (X2) and quite synchronized networks. Therefore, solutions like HSPA multi-flow may be a solution for LTE-5G tight integration (and NR-NR multi-connectivity) enabling coverage extension due to selection ratio combing (SRC). This is not as good as CoMP/Soft handover which enables MRC but can still give large benefits especially in situations with very fast and varying channels.

SUMMARY

It is an object to provide mechanisms whereby it will be possible to improve the handling of multi/dual connectivity. A particular object is to provide mechanisms whereby duplication or multiplication transmissions, where the same packets are transmitted to a recipient from several transmitters, can be controlled.

Another particular object is to provide methods and devices that enables activation and deactivation of a packet multiplication/duplication transmission.

Yet another object is to provide methods that enables a wireless device to influence the activation and/or deactivation of multiplication/duplication transmissions and a corresponding device, computer program and computer-program product as well as a corresponding apparatus.

Yet another object is to provide methods whereby network entities can determine when to timely activate and deactivate a duplication transmission and corresponding network units, network devices, computer program and computer-program product as well as a corresponding apparatus.

These and other objects are met by embodiments of the proposed technology.

According to a first aspect, there is provided a method performed by a wireless device for enabling activation and/or deactivation of a packet multiplication/duplication transmission. The wireless device having connections to at least two network units. The method comprises the step of obtaining at least one quality indication representative for the quality of the respective connection between the wireless device and the network units. The method also comprises the step of generating, based on the obtained quality indication, a message comprising information related to the obtained quality indication that enables the network units to determine whether to activate a packet multiplication/duplication transmission mode. The method also comprises the step of conveying the generated message to at least one network unit to enable the network unit to determine whether to activate or deactivate a packet multiplication/duplication transmission mode.

According to a second aspect there is provided a method for controlling a packet duplication/multiplication transmission to a wireless device having connections to at least two radio units. The method comprises the step of receiving information indicative of the quality of the connection between the wireless device and each of the at least two radio units. The method also comprises the step of determining, based on the received information, whether to initiate or terminate a packet multiplication/duplication transmission to the wireless device from the at least two radio units. The method also comprises the step of initiating or terminating a duplication transmission from the radio units to the wireless device if it is determined that such a transmission should be initiated or terminated.

According to a third aspect there is provided a wireless device configured to enable an activation and/or deactivation of a packet multiplication/duplication transmission. The wireless device having connections to at least two network units. The wireless device is configured to obtain a quality indication representative for the quality of the respective connection between the wireless device and the network units. The wireless device is also configured to generate, based on the obtained quality indication, a message comprising information related to the obtained quality indication that enables the network units to determine whether to activate a packet multiplication/duplication transmission mode. The wireless device is also configured to convey the generated message to at least one network unit to enable the network unit to determine whether to activate or deactivate a packet multiplication/duplication transmission mode where packets are multiplied/duplicated and sent to the wireless device from each of said at least two network units.

According to a fourth aspect there is provided a network device that is configured to control a packet duplication/multiplication transmission to a wireless device having connections to at least two radio units. The network device being adapted to coordinate the transmissions to the wireless device from the at least two radio units. The network device is configured to receive information indicative of the quality of the connection between the wireless device and each of the at least two radio units. The network device is also configured to determine, based on the received information, whether to initiate or terminate a packet multiplication/duplication transmission to the wireless device from the at least two radio units. The network device is also configured to initiate or terminate a multiplication/duplication transmission from the radio units to the wireless device if it was determined that such a transmission should be initiated or terminated, respectively.

According to a fifth aspect there is provided a computer program for operating, when executed by a processor, a wireless device to enable an activation and/or deactivation of a packet multiplication/duplication transmission, the wireless device having connections to at least two network units, wherein the computer program comprises instructions, which when executed by the processor, cause the processor to:

read a quality indication representative for the quality of the respective connection between the wireless device and the network units;

generate, based on the read quality indication, a message comprising information related to the obtained quality indication that enables the network units to determine whether to activate or deactivate a packet multiplication/duplication transmission mode;

prepare a transmission of the generated message to at least one network unit to enable the network unit to determine whether to activate or deactivate a packet multiplication/duplication transmission mode where packets are multiplied/duplicated and sent to the wireless device from each of said at least two network units.

According to a sixth aspect there is provided computer program for operating, when executed by a processor, a network device to control a packet duplication/multiplication transmission to a wireless device having connections to at least two radio units. The computer program comprises instructions, which when executed by the processor, cause the processor to:

read received information indicative of the quality of the connection between the wireless device and each of the at least two radio units;

determine, based on the read information, whether to initiate or terminate a packet multiplication/duplication transmission to the wireless device rom the at least two radio units;

prepare an initiation or a termination of a multiplication/duplication transmission from the radio units to the wireless device if it is determined that such a transmission should be initiated or terminated.

According to a seventh aspect there is provided a computer program product comprising a computer-readable medium in which a computer program according to the sixth aspect is stored.

According to an eight aspect there is provided an apparatus for controlling a wireless device to enable an activation and/or deactivation of a packet multiplication/duplication transmission, the wireless device having connections to at least two network units. The apparatus comprises a reading module for reading a quality indication representative for the quality of the respective connection between the wireless device and the network units. The apparatus also comprises a generating module for generating, based on the read quality indication, a message comprising information related to the obtained quality indication that enables the network units to determine whether to activate or deactivate a packet multiplication/duplication transmission mode. The apparatus also comprises a preparing module for preparing a transmission of the generated message to at least one network unit to enable the network unit to determine whether to activate or deactivate a packet multiplication/duplication transmission mode whereby packets are multiplied/duplicated and sent to the wireless device from each of the at least two network units.

According to a ninth aspect there is provided an apparatus for controlling a network device to control a packet duplication/multiplication transmission to a wireless device having connections to at least two radio units, the network device being adapted to coordinate the transmissions to the wireless device from the at least two radio units. The apparatus comprises a reading module for reading received information indicative of the quality of the connection between the wireless device and each of the at least two radio units. The apparatus also comprises a determining module for determining, based on the read information, whether to initiate or terminate a packet multiplication/duplication transmission to the wireless device from the at least two radio units. The apparatus also comprises a preparing module for preparing an initiation or a termination of a multiplication/duplication transmission from the radio units to the wireless device if it is determined that such a transmission should be initiated or terminated.

Embodiments of the proposed technology enables/makes it possible to achieve a good balance between improvements to the transmission reliability and the efficient usage of the system resources.

The embodiments moreover provides for duplicated transmissions that are fast enabled when deemed necessary. The proposed duplicated transmissions can moreover be disabled in a swift manner when not needed.

The embodiments of the proposed technology also avoids UP latency due to the PDCP packet forwarding in Hos. The data duplication is able to be triggered before the HO occurs Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIGS. 1-21 are schematic diagrams illustrating examples related to the proposed technology where:

FIG. 1 is a schematic diagram illustrating multi/dual connectivity in a wireless communication system.

FIG. 2 is a schematic diagram illustrating multi/dual connectivity in a wireless communication system where a central unit communicates with radio network nodes.

FIG. 3 is a schematic illustration of the link layers of a protocol stack of a wireless communication system.

FIG. 4 is a more detailed illustration of the link layers of a protocol stack of a wireless communication system.

FIG. 5 is a schematic diagram illustrating a particular example of network units involved in multi/dual connectivity and packet multiplication/duplication, using the protocol stack described in connection with FIG. 4.

FIG. 6 is a schematic diagram illustrating another particular example of network units involved in multi/dual connectivity and packet multiplication/duplication, using the protocol stack described in connection with FIG. 4.

FIG. 8 is a signal diagram illustrating the signaling according to a particular embodiment of the proposed technology.

FIG. 9 is a schematic flow diagram illustrating a particular example of the proposed technology.

FIG. 10 is a schematic illustration of a cell comprising a master node, MeNB and a secondary node SeNB as well as a wireless device FIG. 11 is a schematic illustration of a first cell comprising a source node and a second cell comprising a target node.

FIG. 12 is a schematic flow diagram illustrating a method according to the proposed technology.

FIG. 13 is a schematic flow diagram illustrating a method according to the proposed technology.

FIG. 14 is a schematic flow diagram illustrating a method according to the proposed technology.

FIG. 17 is a schematic diagram illustrating a computer program implementation for a wireless device or a radio unit according to the proposed technology.

FIG. 18 is a schematic diagram illustrating a computer program implementation for a network device according to the proposed technology.

FIG. 19 is a schematic illustration of an apparatus according to the proposed technology.

FIG. 20 is a schematic illustration of an apparatus according to the proposed technology.

FIG. 21 is a schematic illustration of an apparatus according to the proposed technology.

DETAILED DESCRIPTION

Throughout the drawings, the same reference designations are used for similar or corresponding elements.

Figure 3:
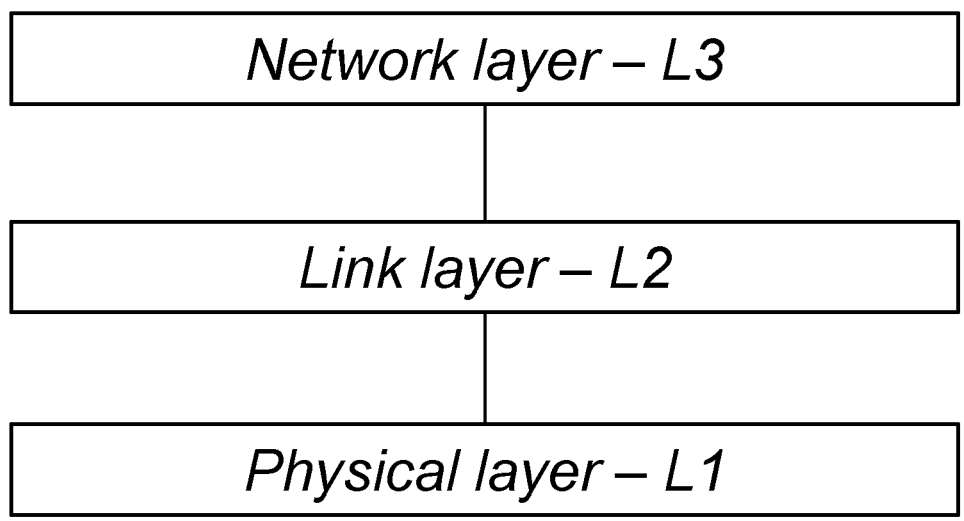
Figure 4:
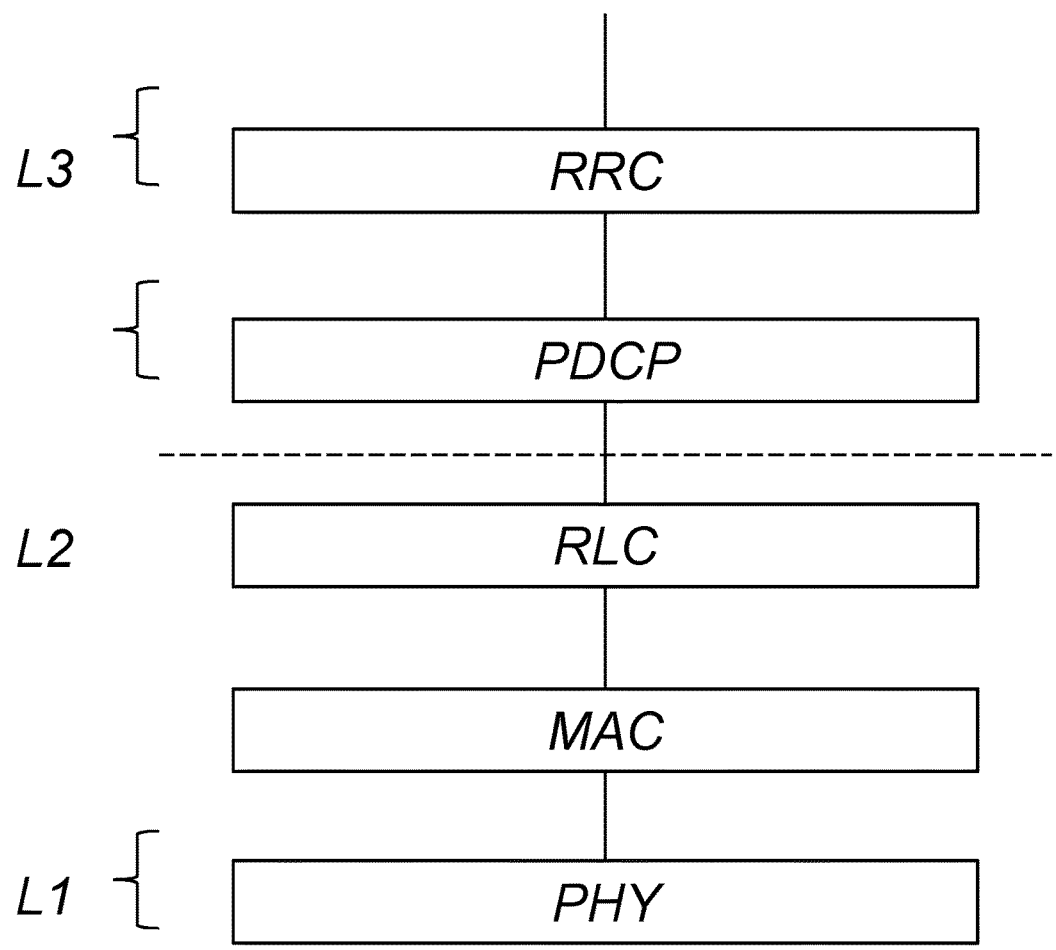

For a better understanding of the proposed technology, a brief overview of a few non-limiting examples of the protocol stack of a wireless communication system can be made with reference to FIG. 3 and FIG. 4.

According to well-accepted technology, a simple way to illustrate a protocol stack of a wireless communication system is to divide the stack into three different layers: the physical layer, the link layer, and the network layer, as schematically shown in FIG. 3. The physical layer is sometimes referred to as layer 1, L1. The link layer is sometimes referred to as layer 2, L2. The network layer is sometimes referred to as layer 3, L3.

FIG. 4 is a schematic diagram illustrating a particular example of three protocol layers, including sub-layers, of a protocol stack suitable for a wireless communication system such as LTE, NR and the like.

The protocol stack is typically implemented for some form of underlying network unit or device including radio circuitry coupled to one or more antennas and/or circuits for communication with other similar network units such as network nodes, end user equipment and/or other network devices.

The lowest layer, L1, is the Physical Layer, PHY, followed by layer 2, L2, which includes the Medium Access Control, MAC, layer, the Radio Link Control, RLC layer, and the Packet Data Convergence Control, PDCP, layer. Layer 3, L3, includes the Radio Resource Control, RRC, layer and optionally also other sub-layers.

L1 handles uplink and downlink in the Physical Layer, Layer 1 of the protocol stack. In uplink, L1 may for example process antenna data received from the radio circuitry, which processing may include removing cyclic prefix, running Fast Fourier Transform, FFT, to extract sub-channels, decoding/demodulating symbols, extracting physical channels and passing user information up to the MAC layer of L2. In downlink, L1 may for example take user data provided by the MAC lower of L2. Examples of tasks that may be performed by L1 in downlink may include constructing physical channels, performing turbo coding, scrambling, modulating, layer mapping, pre-coding, frequency mapping, inverse FFT, and cyclic prefix insertion and sending antenna data to the radio circuitry. To handle this processing, specialized hardware may be used, including accelerators, to form processing chains.

L2 typically includes a synchronous part and an asynchronous part. The synchronous part of L2 normally includes the MAC and RLC sub-layers. The asynchronous part of L2 normally includes the PDCP sub-layer.

The MAC sub-layer may have a separate entity for each connected UE, and a few additional entities for common needs such as system information, paging, and random access response. The RLC sub-layer may have a separate entity for each logical channel, corresponding to radio bearers. Downlink and uplink may operate independently of each other, with some signaling forwarded from the uplink to the downlink. Downlink: A task of synchronous L2 in downlink may be to take PDCP Packet Data Units, PDUs, from a PDCP PDU buffer and build MAC PDUs that are sent to L1. This may be triggered by a transmit order from User Plane Control, UPC, and is normally part of a latency-critical processing path. For example, less than 0.5 ms may be allowed for the synchronous L2 processing in downlink. In split scenarios this includes transport latency as well as processing latency. In downlink the synchronous part of L2 may also handle multiplexing of logical channels, HARQ retransmissions, MAC control elements, MAC procedures such as random access, RLC PDU buffering and retransmissions, and RLC status messages. The PDCP PDU buffers may typically be shared between the asynchronous part of L2 and the synchronous part of L2. If this is not possible, for example, if the asynchronous part of L2 is placed at a different site, a flow control mechanism may be added to transfer PDCP PDUs from the asynchronous part of L2 to the synchronous part of L2. Uplink: A task of the synchronous part of L2 in uplink may be to deconstruct MAC PDUs received from L1 into PDCP PDUs that are delivered to the asynchronous part of L2. In uplink, the synchronous part of L2 may also handle MAC control elements, MAC procedures such as random access, de-multiplexing of logical channels, RLC PDU buffering, reordering and retransmissions, and RLC status messages. In uplink the synchronous part of L2 may typically not be part of a latency critical processing path, but may have a direct impact on the end-to-end packet latency.

User Plane Control (not shown explicitly in FIG. 4) comprises fast Radio Resource Management, RRM, functions that may occur on a per-sub-frame basis. This may e.g. include air-interface resource scheduling, link adaptation (transport format selection), and power control. UPC may use input from L1 and/or the synchronous part of L2, and generate messages to L1 and/or the synchronous part of L2. The input may include buffer status reports, measurement reports, Channel Quality Indicator, CQI, reports, and HARQ feedback. The messages may be control information sent to the UEs, as well as uplink and downlink scheduling commands sent to L1 and the synchronous part of L2. UPC may thus handle scheduling and optimization problems, involving many UEs and shared resources such as spectrum, power, and hardware.

As indicated, the asynchronous part of L2 normally includes the PDCP layer, whose primary tasks may be ciphering, header compression, and integrity protection for signaling. It may also support lossless handover. In downlink, the asynchronous part of L2 may maintain a PDCP PDU buffer, which is often shared with the synchronous part of L2. In cases where this is not possible, such as if L2 is split between different sites, a flow-control mechanism may be needed to transfer PDUs between the asynchronous part of L2 and the synchronous part of L2.

The L3 sub-layer RRC normally includes the control of one or more of the following functions: connection handling, such as setup and release of connections, mobility handling, such as handover or redirection release, UE Measurement Control, Load Management, such as Inter-Frequency Load Balancing and Offload, and Enhanced Multimedia Broadcast and Multicast Services, eMBMS. By way of example, services and functions of the RRC sub-layer of L3 may also include broadcast of System Information, key management, establishment, configuration, maintenance and release of point-to-point Radio Bearers.

Non-Access Stratum, NAS, which may also be regarded as part of L3, typically form the highest stratum of the control plane between the UE and the Mobility Management Entity, MME. NAS supports the mobility of the UE and the session management procedures to establish and maintain IP connectivity between the UE and a corresponding gateway.

Figure 5:
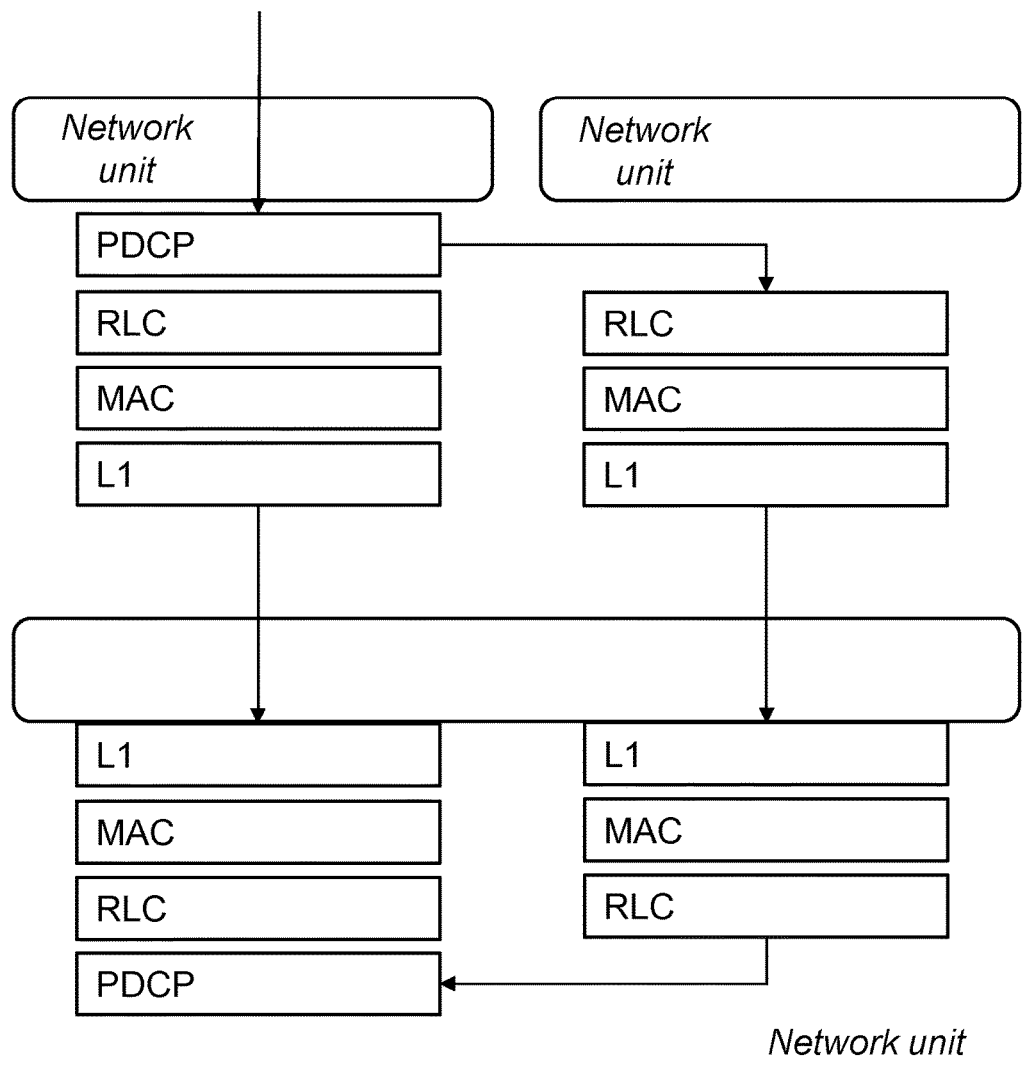

FIG. 5 is a schematic diagram illustrating a particular example of network units involved in multi/dual connectivity and packet multiplication/duplication, using the protocol stack described in connection with FIG. 4.

In this example, a first network unit 1 implements L1, MAC, RLC, as well as PDCP, and a second network unit 2 implements L1, MAC and RLC, and a third network unit 3 implements L1, MAC, RLC, PDCP for the first connection in relation to the first network unit 1 and L1, MAC, RLC for the second connection in relation to the second network unit 2.

Figure 6:
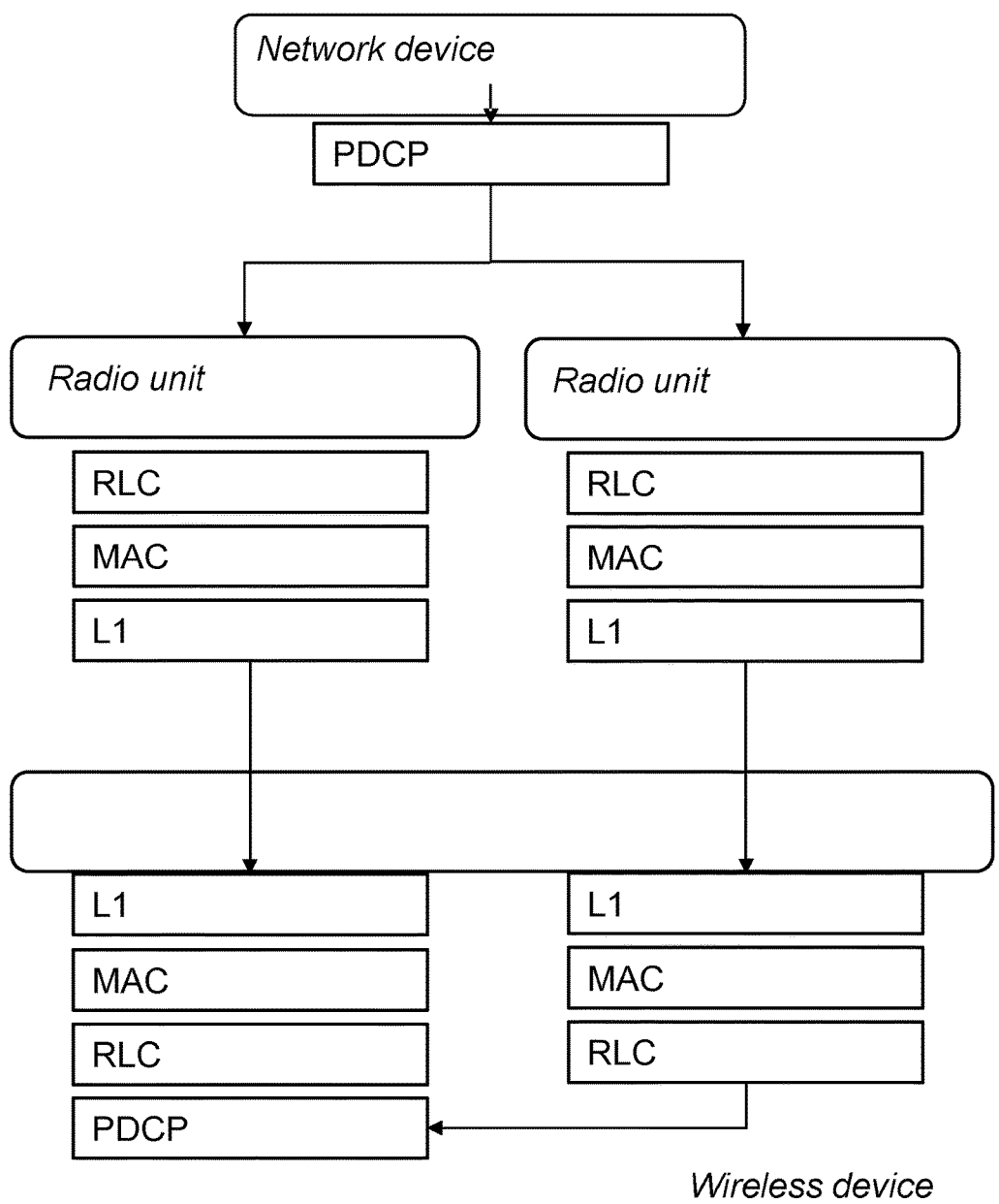

FIG. 6 is a schematic diagram illustrating another particular example of network units involved in multi/dual connectivity and packet multiplication/duplication, using the protocol stack described in connection with FIG. 4.

In this example, the first and second network units are illustrated as radio units, and the third network unit as a wireless device. Both the first radio unit 1 and the second radio unit implements L1, MAC, RLC, while a central network device 4 implements PDCP, e.g. to coordinate duplication of PDCP Packet Data Units, PDCP PDUs, and distribute them among the multiple connections to the wireless device 3.

Figure 1:
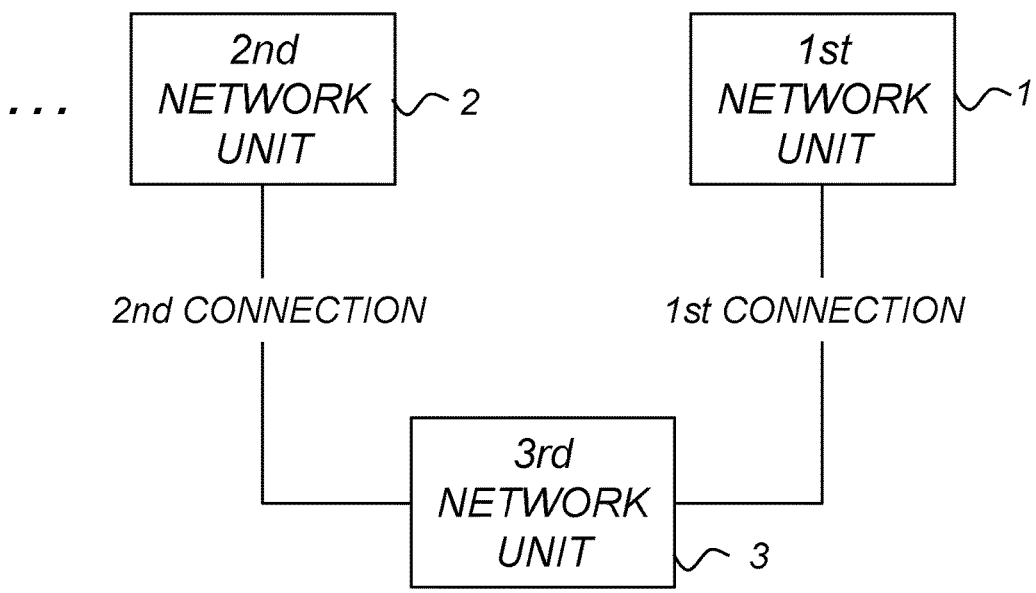

To further facilitate the understanding of the proposed technology, it is useful to provide a brief system overview and an analysis of the technical problem. To this end reference is made to FIG. 1. FIG. 1 provides an illustration of an exemplary environment where the proposed technology may be utilized. Shown is two network units, a first network unit 1 and a second network unit 2, as well as a third network unit 3, which may be a wireless device. The wireless device 3 is connected to the first and second network units by means of first and second connections, respectively. The first and second connections may be different, e.g. the first connection may be over a first Radio Access Technology, RAT, such as LTE, while the second connection may be over a second RAT, e.g. 5G connection, sometimes referred to as New Radio, NR. An environment where a network unit such as a wireless device, e.g. a user equipment, has connections to several other network units are referred to as multi-connectivity and the special case with two connections is referred to as dual connectivity. Descriptions for the requirements for supporting Dual Connectivity in LTE is provided in Ref. 3GPP15-36300. The network units participating in the DC are often referred to as the master eNB, MeNB, and the secondary eNB, SeNB.

Reference is now made to FIG. 5 which provides an illustration of a radio protocol architecture for Dual Connectivity according to 3GPP-165330 split bearer type. The figure illustrates how duplication of packets using dual connectivity is turned on. Illustrated is three different network units, a first network unit 1 implements PDCP, which network unit may be a MeNB, a second network unit 2 which may be a SeNB, and a third network unit 3, which may be a wireless device, e.g. a user equipment. Packets are duplicated and may be sent to the second network unit over X2. The PDCP SDU packets are packetized by RLC and MAC. Packets are then sent to the third network unit using both the first network unit and the second network unit. FIG. 6 provides an alternative radio protocol The proposed technology may be used in an environment with LTE-5G integrated Multi/Dual Connectivity. In such an environment a wireless device is normally in contact with a master network unit, referred to as a master unit or master cell in 3GPP terminology. This master network unit may act as a coordinating entity for all secondary units falling under its coverage. The secondary units may for example be network units of a 5G architecture, e.g. network units transmitting millimetre wave frequencies, mmWave frequencies. The secondary units may communicate with the master unit over the X2 interface. In this particular environment is one of the basic functionalities of the coordinator to select the particular secondary unit(s) that is/are most suitable for a wireless device to connect to, e.g. based on expected signal quality or based on directional information of the wireless device in case the secondary units utilizes beam formed transmission, beamforming. It should be noted that the coordinating network unit, i.e. the master unit, may be located in the core network. FIG. 6 provides an illustration of a Dual Connectivity radio protocol architecture where a network unit, e.g. a master network device, coordinates two radio units, e.g. two secondary radio units and their communication with a wireless device. The functionalities of the master network device may be implemented in the core network or in the cloud.

A specific problem with e.g. LTE-5G dual connectivity is that it does not increase the coverage of the user plane data.

One option here is to duplicate the packets, i.e. transmit the same PDCP packets in both connections/links/RATs. There is currently no mechanism for how to do activate or deactivate this. State of the art would probably be to use the same, slow, mobility measurements as for normal dual connectivity, i.e. RSRP, RSRQ measurement but exactly how to use these measurements in order to activate or deactivate the duplication feature is not obvious.

To use duplication is costly and should only be used when it is really needed. In many cases it is more efficient to use the best link, i.e. switch the UP data flow at the PDCP level to the best link/RAT. However, in some situations when both links are bad, or alternatingly bad, the duplication feature can be very beneficial. The main problem is thus when to know when to turn it on and when to turn it off.

Below there will be provided a detailed description of the proposed technology and various embodiments. In general the proposed technology relates to various mechanisms that makes it possible to control transmission modes, referred to as multiplication/duplication transmission modes, where the same packet(s) are transmitted from several different radio units, e.g., several different network nodes. A multiplication transmission mode may refer to a transmission mode where packets are transmitted from several different network nodes while a duplication transmission refers to the special case where packets are transmitted from two different network nodes. Duplication transmission mode and multiplication transmission mode are herein used interchangeably since the proposed technology work equally well regardless of the number of network nodes.

It should be noted that packet multiplication/duplication transmissions may refer to transmissions on the downlink, i.e. from network nodes to a wireless device, or transmissions on the uplink, i.e. from the wireless device to network nodes. In the latter case the wireless device will duplicate or multiply a packet and send the same packet to several network nodes, i.e. at least two network nodes. The proposed technology will however mostly be described with regard to downlink transmissions.

The proposed technology provides mechanisms that enables an efficient use of packet multiplication/duplication transmissions allowing for timely activations and deactivations of the same.

The proposed technology moreover provides mechanisms whereby it will be possible to ensure a timely activation and deactivation of packet multiplication/duplication in case one of the connections become compromised or display low-quality features. The proposed technology provides various mechanisms whereby a data packet initially intended to be transmitted from a particular network unit, e.g. a first network unit, to the wireless device/third network unit is multiplied/duplicated and transmitted from all/both network units to the wireless device/third network unit. The method is in broad term based on information about the quality of the connections between the wireless device/third network unit and the first and second network unit. This information may be collected in various ways, to be described later, and conveyed to the first and second network units to enable the first and second network unit to determine, in a coordinated fashion, whether to initiate or terminate a transmission mode where they both transmit the same data packet to the wireless device/third network unit.

FIG. 1 provides an illustration of an exemplary environment where the proposed technology may be utilized. Shown is two network units, a first network unit 1 and a second network unit 2, as well as a wireless device/third network unit 3. The wireless device is connected to the first and second network units by means of first and second connections, respectively. The first and second connections may be different, e.g. the first connection may be over a first Radio Access Technology, RAT, such as LTE, while the second connection may be over a second RAT, e.g. New Radio, NR. The proposed technology provides mechanisms whereby it will be possible to ensure a timely activation of packet multiplication in case one of the connections become compromised or display low-quality features. The proposed technology provides various mechanisms whereby a data packet initially intended to be transmitted from a particular network unit, e.g. the first network unit, to the wireless device/third network unit is multiplied/duplicated and transmitted from all/both network units to the wireless device/third network unit. The proposed methods are in broad term based on information about the quality of the connections between the wireless device/third network unit and the e.g. first and second network units. This information may be collected in various ways, to be described later, and conveyed to at least one of the first and second network units to enable the network unit to determine whether to initiate a transmission mode where both the network units transmit the same data packet to the wireless device/third network unit 3.

Figure 12:
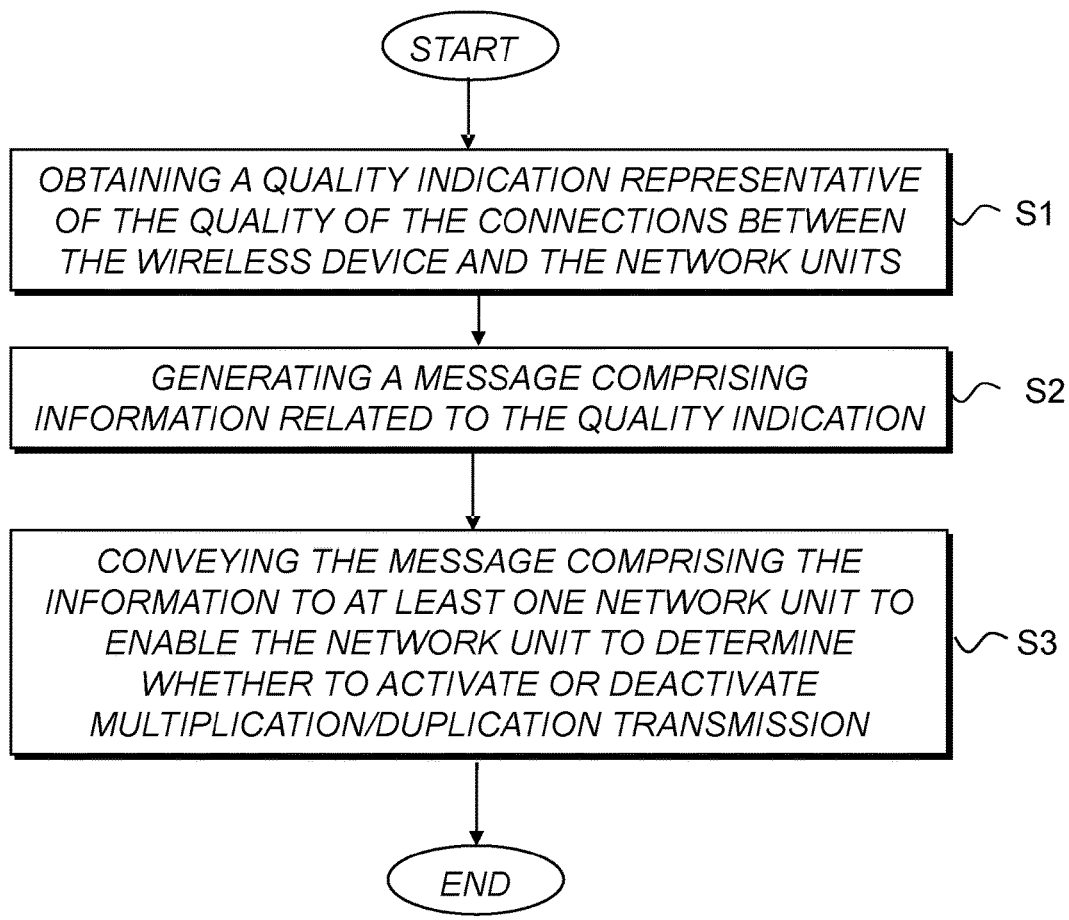

FIG. 12 is a schematic flow diagram illustrating an example of a method performed by a wireless device 3 for enabling activation and/or deactivation of a packet multiplication/duplication transmission. The wireless device 3 having connections to at least two network units 1; 2. The method comprises the step of obtaining S1 at least one quality indication representative for the quality of the respective connection between the wireless device 3 and the network units 1; 2. The method also comprises the step of generating S2, based on the obtained quality indication, a message comprising information related to the obtained quality indication that enables the network units to determine whether to activate or deactivate a packet multiplication/duplication transmission mode. The method also comprises the step of conveying S3 the generated message to at least one of the network units 1; 2 to enable the network unit to determine whether to activate or deactivate a packet multiplication/duplication transmission mode.

As was mentioned earlier, a particular type of packet multiplication/duplication transmission mode is a transmission mode where packets are multiplied/duplicated and sent to the wireless device 3 from each of the at least two network units 1; 2. Another particular type of packet multiplication/duplication transmission mode is a transmission mode where packets are multiplied/duplicated and sent to the at least two network units 1; 2 from the wireless device 3. The proposed method may therefore be used to enable activation or deactivation of a packet multiplication/duplication transmission mode where the packet multiplication/duplication transmission is over either the uplink or the downlink. Regardless of the particular link the network may decide, based on information relating to the quality of the connections between the wireless device and the network units, whether to activate or deactivate a packet multiplication/duplication transmission mode.

The proposed method is moreover equally useful for timely activating a packet multiplication/duplication transmission mode and timely deactivating a packet multiplication/duplication transmission mode. It should be noted that the deactivation of the packet multiplication/duplication transmission mode does not depend on the particular way the packet multiplication/duplication transmission mode was initiated. The packet multiplication/duplication transmission may on the contrary have been initiated in some alternative fashion but may be deactivated based on the mechanisms proposed herein.

Figure 7A:
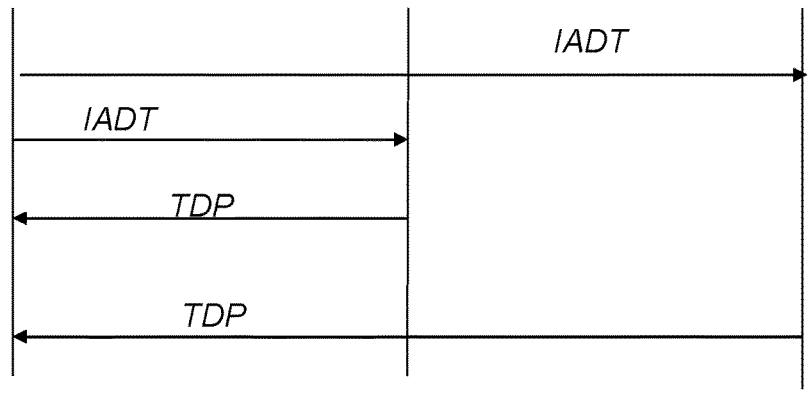
FIG. 7A is a signal diagram illustrating the signaling according to a particular embodiment of the proposed technology.
Figure 7B:
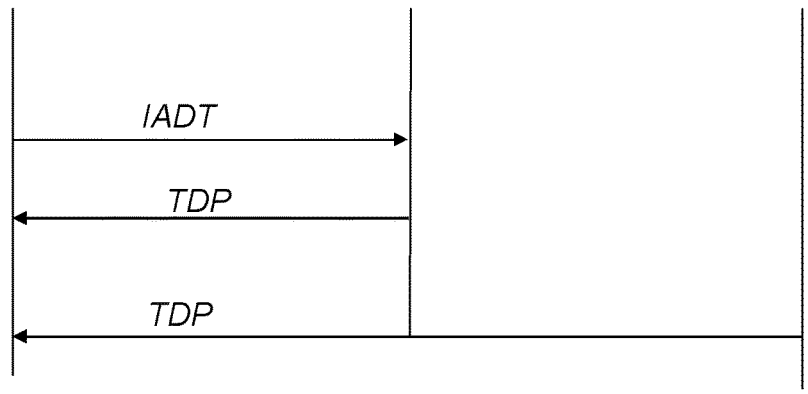
FIG. 7B is a signal diagram illustrating the signaling according to a particular embodiment of the proposed technology.

A signaling diagram illustrating particular examples of the communication between the entities is provided in FIGS. 7A and 7B. In FIG. 7A it is illustrated how the wireless device transmits a message comprising information that enables the network unit(s) to determine whether to initiate a duplication transmission. Here the information is transmitted to network unit 1 as well as network unit 2. In FIG. 7B the information is only conveyed from the wireless device to the first network node. This may be a beneficial signaling for those cases where the first network unit 1 is a master network unit. That is, a unit with the capabilities corresponding to a master Enb, MeNB, in LTE terminology.

It should be noted that the wireless device 3 also may be any type of network unit with multi connectivity features. It should also be noted that the proposed method works equally well for any number of network units 1; 2. The term packet multiplication refers to the case where several network units transmit the same packet while the term packet duplication can be used for the case where two network units transmit the same data packet. The generated message may be conveyed to a master network unit 1 to enable the master network unit 1 to determine whether to activate or initiate a packet duplication transmission whereby the same packets are sent to the wireless device 3 from each of the at least two network units 1; 2. The other network unit(s) 2 may in this particular embodiment be a secondary network unit. The LTE-terminology refer to such network units as master eNB, MeNB, and secondary Enb, SeNB, respectively. It is however also possible to convey the message to the secondary network unit enabling the secondary network unit to activate or initiate the duplication transmission.

Figure 2:
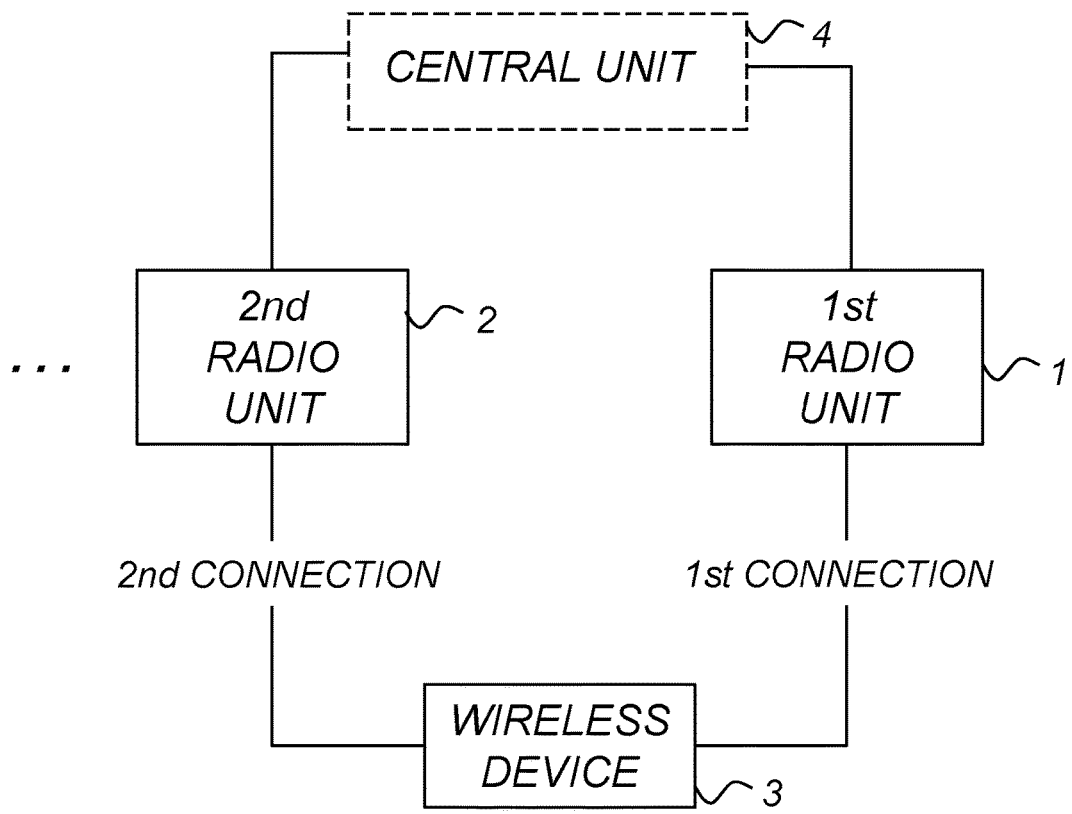

FIG. 2 provides a particular environment where the proposed method may be utilized. FIG. 2 illustrates two radio units, a first radio unit 1 and a second radio unit 2. Each of the radio units 1; 2 are connected to a central unit, or a central network device 4, and are further connected to a wireless device 3 over first and second connections, respectively. The difference between this environment and the environment illustrated in FIG. 1 is that the radio units does not have to be able to coordinate packet duplication and may therefore be reduced to radio units that are able to perform the tasks of the layers below the PDCP-layer. The PDCP duplication may instead be provided by the central unit 4. The central unit 4 may thus coordinate duplication of PDCP Packet Data Units, PDCP PDUs, and distribute them amongst the multiple connections to the wireless device 3. The network units 1; 2 described in relation to the proposed method above may thus equally well be radio units if the radio units are equipped with a connection to a central unit that is capable of coordinating packet duplication.

In what follows below, various embodiments of the proposed method will be given. These particular embodiments are indifferent to whether the information conveyed from the wireless device is addressed to a network unit with PDCP capabilities, sometimes referred to as a central PDCP entity, or to radio unit with capabilities below the PDCP layer.

A particular embodiment of the proposed technology provides a method that enables an activation of packet multiplication/duplication transmission and wherein the step S3 comprises to convey the generated message to at least one network unit 1; 2 to enable the network unit to determine whether to activate a packet multiplication/duplication transmission mode.

Another particular embodiment of the proposed technology provides a method that enables deactivation of packet multiplication/duplication transmission and wherein the step S3 comprises to convey the generated message to at least one network unit 1; 2 to enable the network unit to determine whether to deactivate a packet multiplication/duplication transmission mode.

According to one particular embodiment of the proposed technology there is provided a method wherein the step S1 of obtaining a quality indication comprises at least one quality indicator indicating bad quality.

According to a particular embodiment of the proposed technology there is provided a method wherein the step S1 of obtaining a quality indication comprises to obtain information indicating that the wireless device 3 is subject to a handover.

A beneficial embodiment dealing with the problem of handover is provided by a method wherein the step S2 of generating a message comprises to generate a message that instructs, or request, at least one of the network units 1; 2 to activate a multiplication/duplication transmission mode. The wireless device may therefore request a duplication/multiplication transmission based on the mobility. It is only necessary to instruct or request one of the network units 1; 2 to initiate the packet duplication transmission since the other network unit might not be aware of the activation decision.

According to an optional embodiment the generated message may include an indication on whether the duplication should be activated to enable the network to make the decision.

According to another optional embodiment the generated message may include information stating the wireless device preference regarding whether a packet duplication transmission should be activated. This particular information may in certain embodiments add some weight to the request from the wireless device. This may be taken in consideration when the decision is taken by the network, e.g. by a network unit or a network device, whether to activate a duplication transmission or not.

According to yet another optional embodiment the wireless device may receive the indication of the activation of the duplication transmission from one of the network units.

According to a particular embodiment of the proposed technology there is provided a method wherein the step S2 of generating a message comprises to generate a message if at least one indicator indicating bad quality on at least one connection is obtained and to convey S3 information comprising the quality indicator to at least one of the network units.

According to an alternative embodiment of the proposed technology there is provided a method wherein the step S1 of obtaining a quality indication comprises performing measurements providing an indication of the quality of the connection between the wireless device and the respective network units 1; 2. By way of example, the indication about the quality of the connection might comprise statistics of the Hybrid Automatic Repeat Request, HARQ, retransmission rates. According to another particular example there is provided a method wherein the statistics of the HARQ retransmission rate comprises the variance of the quality of the HARQ retransmission rate. The statistics may also comprise the variance of the quality of the connection.

Another particular embodiment of the proposed technology relates to a method wherein the wireless device 3 initiates an activation of the duplication/multiplication transmission by comparing the outcome of the performed measurements with specified thresholds or threshold levels. It is in particular provided a method wherein the step S2 of generating information further comprises the step of comparing the indication of the quality of the connection to the respective network unit 1; 2 with a specified threshold level and generating a message that instructs the network units 1; 2 to activate a multiplication/duplication transmission mode based on the outcome of the comparison. As a concrete example consider the case where the wireless device 3 perform measurements on both the connections, i.e. the connection to network unit 1 as well as the connection to network unit 2. The outcome of the measurements may thus be compared with a specific threshold value or a specified threshold level. Based on the outcome of the comparison the wireless device may request multiplication/duplication transmissions whereby data packets addressed to the wireless device are transmitted on both or all connections. A particular comparison criterion may be that various signal quality features are above a specified value. If the signal quality feature is below the specified value on at least one of the connections the wireless device may instruct the network units to perform multiplication/duplication transmissions.

Still another example relates to an embodiment where the wireless devices measures the Signal to Interference plus Noise Ratio, SINR, on the various connections to the different network units/radio units in order to obtain a quality indication of the connection quality between the wireless device 2 and the network units 1, 2. The wireless device may activate a duplication/multiplication transmission by means of a message signaled to the network units 1; 2 based on the outcome of the comparison of the measured SINR-value and a specified threshold level. This may for example be done by generating a message instructing the network units to activate duplication/multiplication transmission if the SINR is below a threshold for any of the connections to the different network units 1; 2.

According to a particular embodiment of the proposed technology the step S3 of conveying a message to at least one of the network units comprises to transmit the message via MAC-CE, or via RRC signaling, or via X2 signaling. X2 signaling may be transmitted between the network units, i.e. from one network unit to another, if one of the network units received the message from the UE. That is, the message can be conveyed to both network units be forwarding via X2 signaling from one particular network unit.

Figure 8:
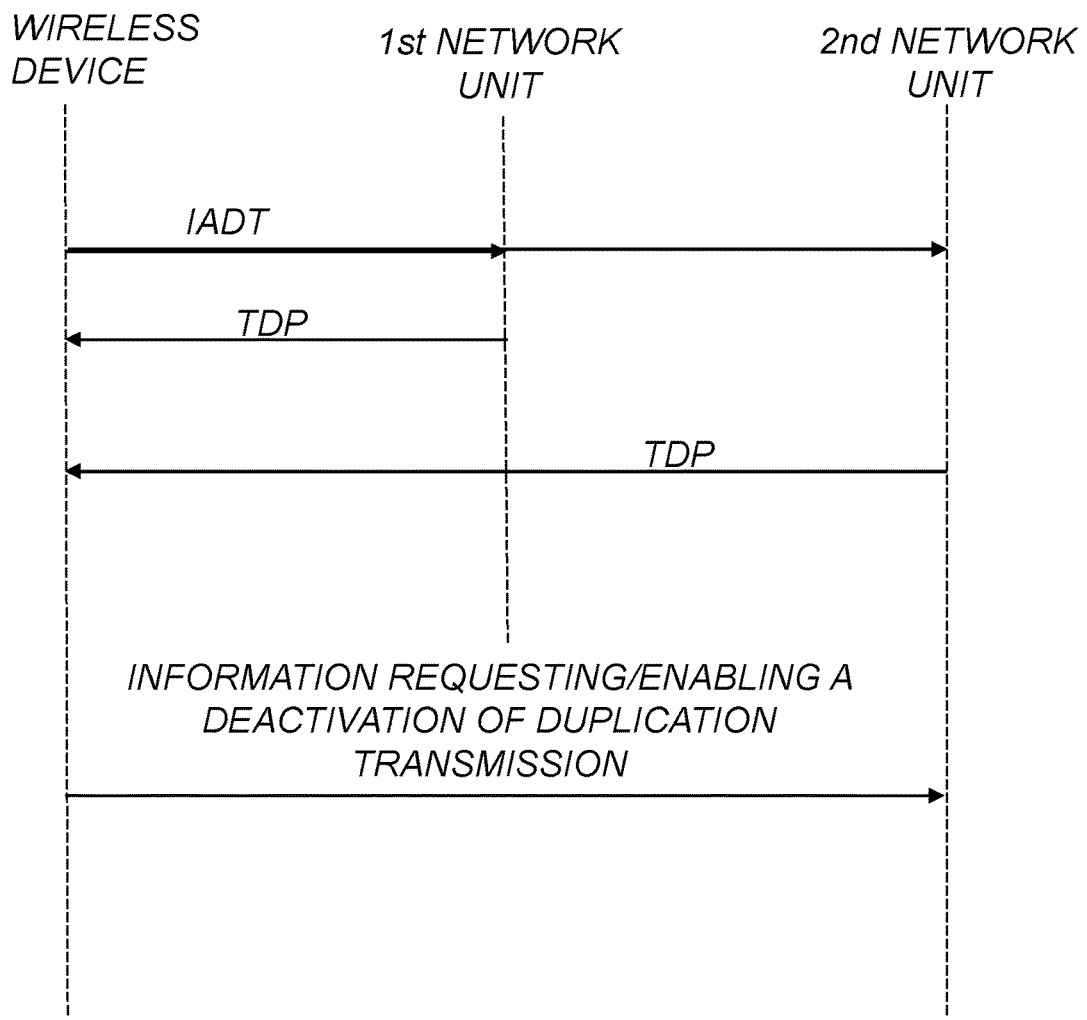

The proposed method may also comprise a step of requesting a deactivation of the duplicate transmission. This may be done by transmitting a message to the network unit(s) providing indications or information that the quality of the connections are satisfying. The deactivation request procedure may be initiated based on the obtained information about the quality of the connections, e.g. by performing measurements and comparing the outcomes with threshold values/levels. If the comparison indicates that the quality is good enough the wireless device may generate a message that requests that duplication transmission to the wireless device from the serving network units are terminated. By way of example, the wireless device may generate a message that requests that duplication transmission to the wireless device from the serving network units are terminated if at least one quality indicator representing the quality of the connections are above a certain threshold. For example, if the duplication transmission was activated based on a comparison where at least one measured quality indicator was below a certain threshold the duplication transmission may be terminated if subsequent measurements indicate that the quality indicator is above the same threshold or a different threshold. The wireless device may generate a message providing indications that the duplication transmission should be deactivated in order to enable the network unit to make the decision. This message may transmitted to at least one network unit via MAC-CE, or via RRC signaling, or via X2 signaling from one network unit to another, if one of the network units received the message. FIG. 8 is a schematic signaling diagram illustrating how a wireless device may request or enable a deactivation of the duplication transmission by transmitting a message to both the first and the second network unit in this particular example.

The already described method steps for enabling an activation of a duplication transmission may equally well be used to deactivate an ongoing duplication transmission. The only difference being the threshold values used in the comparison with the quality indicator information.

The proposed method with the described steps may therefore equally well be seen as a method for enabling activation and deactivation of a packet duplication transmission. The proposed method with the described steps may also equally well be seen as a method for triggering a packet duplication transmission or even as a method for triggering a determination procedure for determining whether to activate a packet duplication transmission.

The proposed method may also comprise the step of receiving an indication that packet duplication transmission has been activated. This indication may be received/signaled from the network, e.g. from at least one network unit or network device granted the right to decide whether packet duplication transmission should be activated and/or deactivated. It may be beneficial to provide for such a feature since the wireless device may act to assist with removing redundant data coming from a particular link/connection if the wireless device is successful in receiving data on the other link/connection. The method may therefore also comprise the step of activating a packet redundancy procedure if an indication that a duplication transmission has been activated is received. Still another embodiment provides a method comprising the step of receiving an indication that a duplication transmission has been deactivated.

Below we will describe a complementary method that is performed on the network side, i.e. performed by network nodes or entities controlling network nodes. According to the proposed technology the complementary method controls packet duplication/multiplication transmissions to a wireless device 3 that has connections to at least two radio units 10; 20. The method comprises receiving S10 information indicative of the quality of the connection between the wireless device 3 and each of the at least two radio units 10; 20. The method also comprises determining S20, based on the received information, whether to initiate or terminate a packet multiplication/duplication transmission to the wireless device 3 from the at least two radio units 10; 20. The method further comprises initiating or terminating S30 a duplication transmission from the radio units 10; 20 to the wireless device 3 if it is determined that such a transmission should be initiated or terminated.

The proposed method may either be performed by any of the radio units 10; 20 or by a network device 4 that acts as a central unit and is able to communicate and control the radio units 10; 20. The former implementation is schematically illustrated in FIG. 1 while the latter is illustrated in FIG. 2. Below there will be separate descriptions of the exemplary embodiments.

Figure 13:
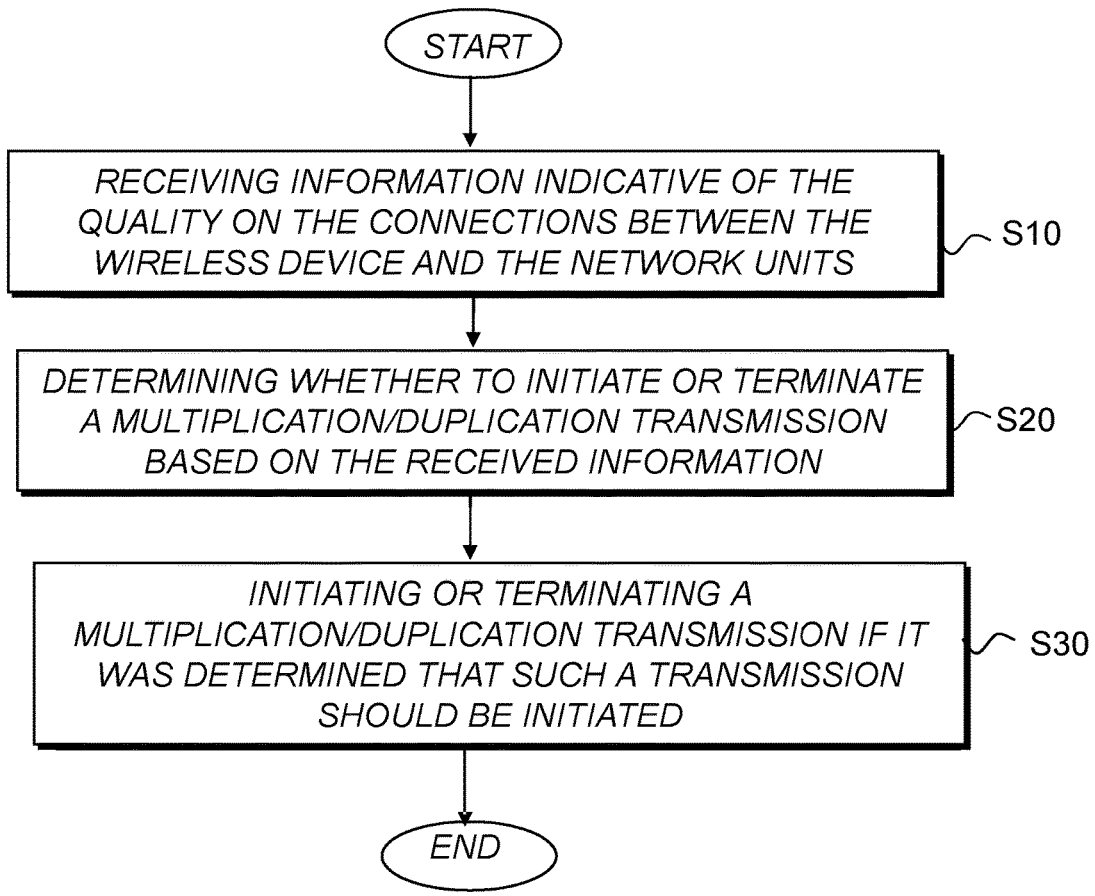

According to a particular embodiment of the proposed method there is provided a method performed by a network device 4 for controlling a packet duplication/multiplication transmission to a wireless device 3 having connections to at least two radio units 10; 20, the network device 4 being adapted to coordinate the transmissions to the wireless device 3 from the at least two radio units 1; 2. The method comprises the step S10 of receiving S10 information indicative of the quality of the connection between the wireless device 3 and each of the at least two radio units 10; 20. The method also comprises the step S11 of determining, based on the received information, whether to initiate or terminate a packet multiplication/duplication transmission to the wireless device 3 from the at least radio units 10; 20. The method also comprises the step S12 of initiating or terminating a duplication transmission from the radio units 10; 20 to the wireless 3 if it is determined that such a transmission should be initiated or terminated. A flow diagram illustrating the proposed method is provided in FIG. 13.

In other words, there is provided a method that is performed by a network device 4 for controlling, i.e. activating and possibly deactivating a duplication or multiplication transmission of packets to a wireless device from at least two radio units. The network device 4 is coordinating the multi connectivity architecture and can be seen as a master unit that coordinates the actions of the radio units 10; 20 that have connections to the wireless device 3. The network device 4 may be a master network unit under which coverage the radio units 10; 20 fall, in much the same way as a MeNB in an LTE environment. The network device 4 may also reside in the core network, e.g. in the cloud. The radio units 10; 20 may be adapted for different radio access technologies, e.g. a first radio unit 10 may be adapted for 5G radio, e.g. adapted to beam formed transmissions while the second radio unit may be adapted to some other radio access technology. They may however also be adapted to a common radio access technology. A particular purpose of the method is to activate a duplication transmission whereby the same packets are transmitted to the wireless device 3 from the both the first radio unit 10 and the second radio unit 20. This is accomplished by means of the proposed method. The method is initiated when the network device receives, or obtains, in a step S10, information that provides an indication of the quality of the connection between the wireless device 3 and each of the at least two radio units 10; 20. The information may have been transmitted from the wireless device 3 to the network device 4 or may have been signaled to any/both of the radio units and then relayed to the network device 4. How the particular information is generated and utilized by the wireless device 3 was described earlier in the description. Having obtained the information the method proceeds and determines whether to initiate a duplication transmission based on the obtained information. Since the wireless device/network unit 3 provides information that enables an activation of a duplication transmission this particular information may be used as input to the determining step in order to decide whether to initiate an activation of a duplication transmission.

Finally, if it was determined that a duplication transmission should be initiated, the network device 4 initiates such a transmission by ordering the radio units to transmit the same packets to the wireless device 3.

The method may optionally also comprise the step of sending or signaling the outcome of the method, i.e. whether a multiplication/duplication transmission is initiated/activated or not, to the corresponding wireless device. This may be done at least for the case when a multiplication/duplication transmission is activated or initiated. This information may prove beneficial since the wireless device may, if such information is known, provide assistance with removing redundant data copies on a particular link if the wireless device is able to receive data on another link.

Figure 14:
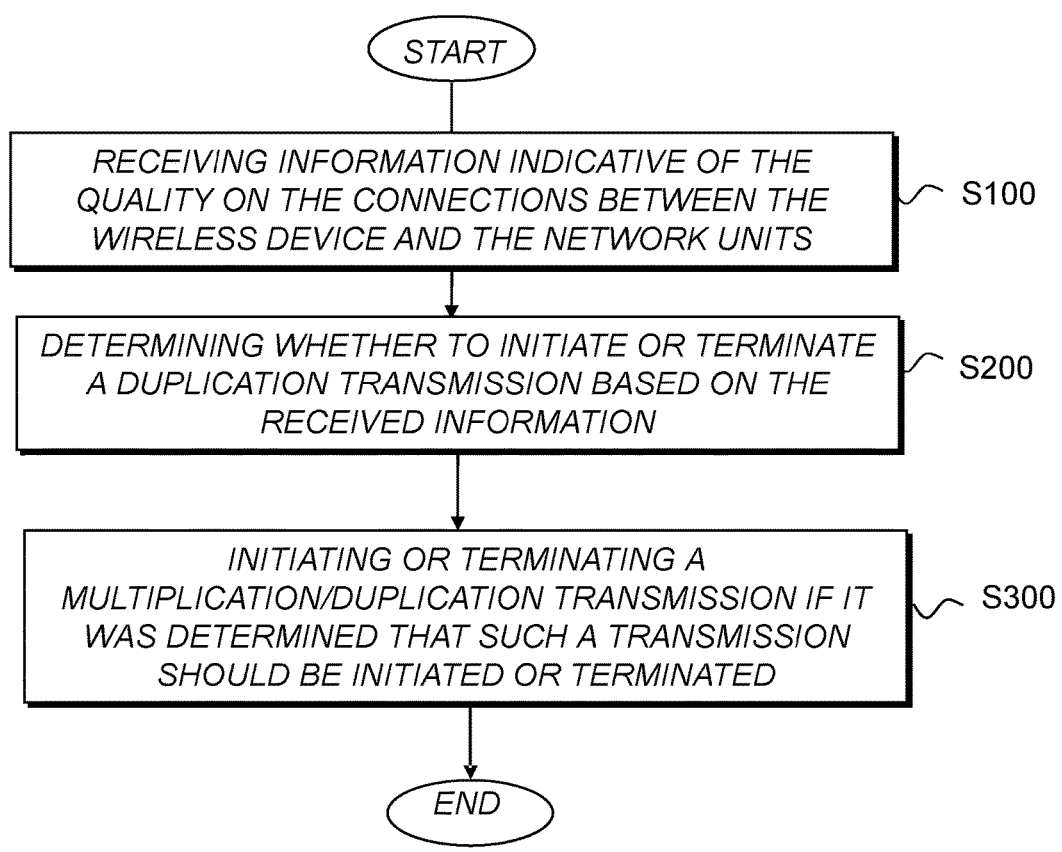

According to another possible embodiment of the proposed method there is provided a method performed by a network unit 1 for controlling a packet duplication/multiplication transmission to a wireless device 3 having connections to the network unit 1 and at least one more network unit 2. The method comprises the step S100 of receiving information indicative of the quality of the connection between the wireless device 3 and the network unit 1 and the quality of the connection between the wireless device 3 and each of the at least one network unit(s) 2. The method also comprises the step S110 of determining, based on the received information, whether to initiate a packet multiplication/duplication transmission to the wireless device 3, whereby the same packets are transmitted from the network unit 1 and the network unit 2. The method also comprises the step S120 of ordering the network unit 2 to perform a duplication transmission whereby the same packets are transmitted to the wireless device 3 from both the network unit 1 and the network unit 2, if it is determined that such a duplication transmission should be initiated. A flow diagram illustrating this particular embodiment is provided in FIG. 14.

The method may optionally also comprise the step of sending or signaling the outcome of the method, i.e. whether a duplication transmission is initiated or not, to the corresponding wireless device. This information may prove beneficial since the wireless device may, if such information is known, provide assistance with removing redundant data copies on a particular link if the wireless device is able to receive data on another link.

The network unit 1 performing the method may in this particular embodiment be a master network unit 1, e.g. a MeNB in LTE, while the network unit 2 may be a secondary network unit, e.g. a SeNB in LTE.

It is however also be possible that the network unit 1 is the secondary network unit while the network unit 2 the master network unit. That is, the proposed technology provides a method where a secondary network unit controls the multiplication/duplication transmissions.

The above described method provides an alternative embodiment of the method that was performed by the network device 4. The purpose of the two method embodiments is to initiate a packet duplication transmission based on information about the quality of the connections between the wireless device and the network units/radio units.

The proposed methods above, i.e. the methods performed by the network device 4 or the network device 1 may also be supplemented with a particular step where the network device or the network units informs the wireless device 3 the outcome of the method, i.e. whether a duplication transmission was initiated or not. This may be done at least for the case where a duplication transmission was initiated.

The proposed methods may also be supplemented with a particular step where an initiated duplication transmission is terminated. This termination of the duplication transmission process may be triggered by means of obtaining, e.g. receiving, information from the wireless device that the quality of the connections between the wireless device 3 and the radio units/network units are satisfying.

It should be noted that the proposed methods acts complementary to the method where the wireless device/network unit 3 provides information that enables an activation of a duplication transmission. Hence the information provided from the wireless device may be utilized to control activation and deactivation of multiplication/duplication transmission.

The information received or obtained may in a particular embodiment be a quality indication comprising information indicating that the wireless device 3 is subject to a handover. This information may thus be utilized, possibly together with supplementary information, to determine whether to initiate an activation of a multiplication/duplication transmission.

The information received or obtained may in another embodiment be a message form the wireless where the wireless device requests a multiplication/duplication transmission from the radio units/network units, the request may be supplemented with information why a multiplication/duplication transmission is requested. Examples of such information may be indications of poor connection quality derived from measurements performed by the wireless device, e.g. a SINR-value that is below a specific threshold.

The information received, or obtained, may in another embodiment be statistics of the Hybrid Automatic Repeat Request, HARQ, retransmission rates of the different links between the wireless device and the radio units/network units. If the statistics indicate that the HARQ error rate is above a specific threshold the network unit or the network device may determine that packet duplication transmission should be initiated. According to a particular version of this embodiment, the statistics of the Hybrid Automatic Repeat Request retransmission rates may comprise the variance of the Hybrid Automatic Repeat Request retransmission rates on the different links/connections between the wireless device and the radio units/network units. The network device or the network unit may determine that a packet duplication transmission should be initiated if the obtained statistics fulfills a particular criterion on at least one of the links, e.g. if the HARQ error rate is above a particular threshold value on a particular link/connection.

The proposed methods above, i.e. the methods performed by the network device 4 or the network device 1 for controlling an activation of a duplication transmission may equally well be used in order to deactivate an ongoing duplication transmission. The difference being the threshold values used in the comparison with the quality indicator information.

Below there will be provided a few illustrating examples. These examples are merely intended to facilitate the understanding of the proposed technology and should not be construed as limiting.

The basic assumption of these examples is that the wireless device or the UE is in dual/multi connectivity. For simplicity we assume two connections/links/RATs now. The basic idea is to turn on the duplication when both links have relatively bad coverage (SINR). This is applicable to the normal handover scenario between 2 cells, i.e. at the cell-edge scenario. Thus, according to one embodiment the duplication feature is turned on when a mobility event is triggered and turned off when no handover event is fulfilled.

However, since 5G will operate in higher frequency with beamforming, BF, the NR link is expected to be more sensitive due to less diffraction of the signal at higher frequencies. Also, at high frequencies and BF the link may be subjected to very fast changes due to shadowing. Thus, another embodiment of the solution is to use faster measurements than used for normal mobility, such as the retransmission rate of the HARQ which can react fast on any changes in coverage.

There may be situations when one link, e.g. the NR link, may have alternatingly very good and very bad coverage. In these situations, there may be a benefit to duplicate the packets over both links, e.g. over both LTE-link and the NR-link, even if the LTE link has good signal. In this case it might be necessary to have knowledge of both links separately in order to know when to turn on/off the duplication feature. Thus, yet another embodiment of the proposed solution is to let the UE measure the HARQ retransmission rate of the links and send these measurements to the network and let the network decide when to turn on or off the duplication feature. A fourth embodiment of the solution is to let the UE measure the HARQ retransmission rate of the links and let the UE signal to the network when to turn on the duplication feature.

Figure 9:
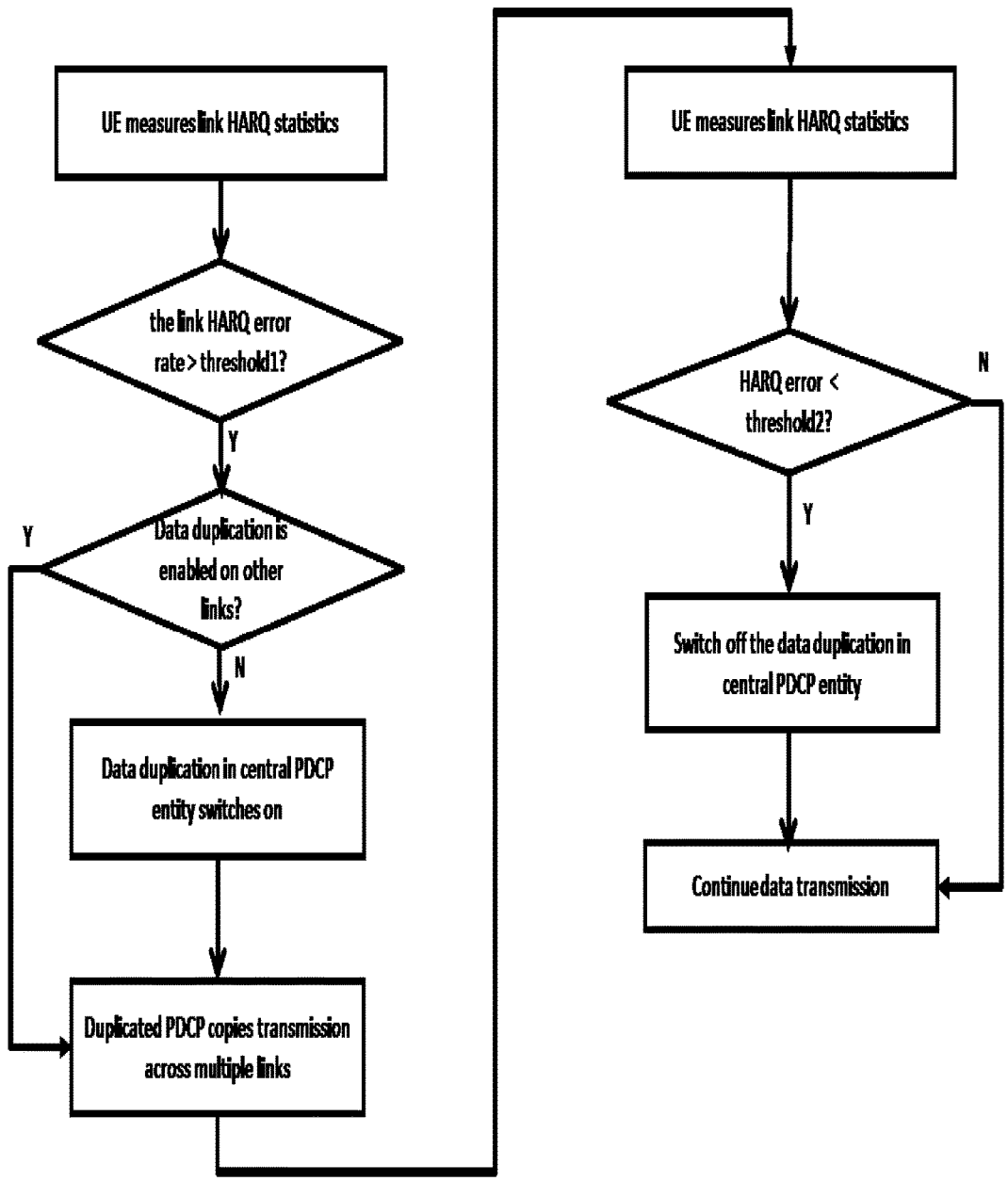

A particular example of the proposed technology is illustrated in the flow diagram of FIG. 9. A metric in terms of HARQ retransmissions is used in the decision logic. The higher layer entity, such as a central PDCP entity can duplicate the PDCP PDUs, when the feature is enabled. The duplicated PDCP PDUs are distributed amongst multiple connections. Hence, the data transfer has a higher probability to recover from the transmission failures in lower layers.

As shown in FIG. 9, the duplicated transmission is enabled when a UE suffers from the HARQ transmission failures, while the duplicated transmission is disabled when HARQ transmissions turns to be more reliable on one of the connection.

Figure 10:
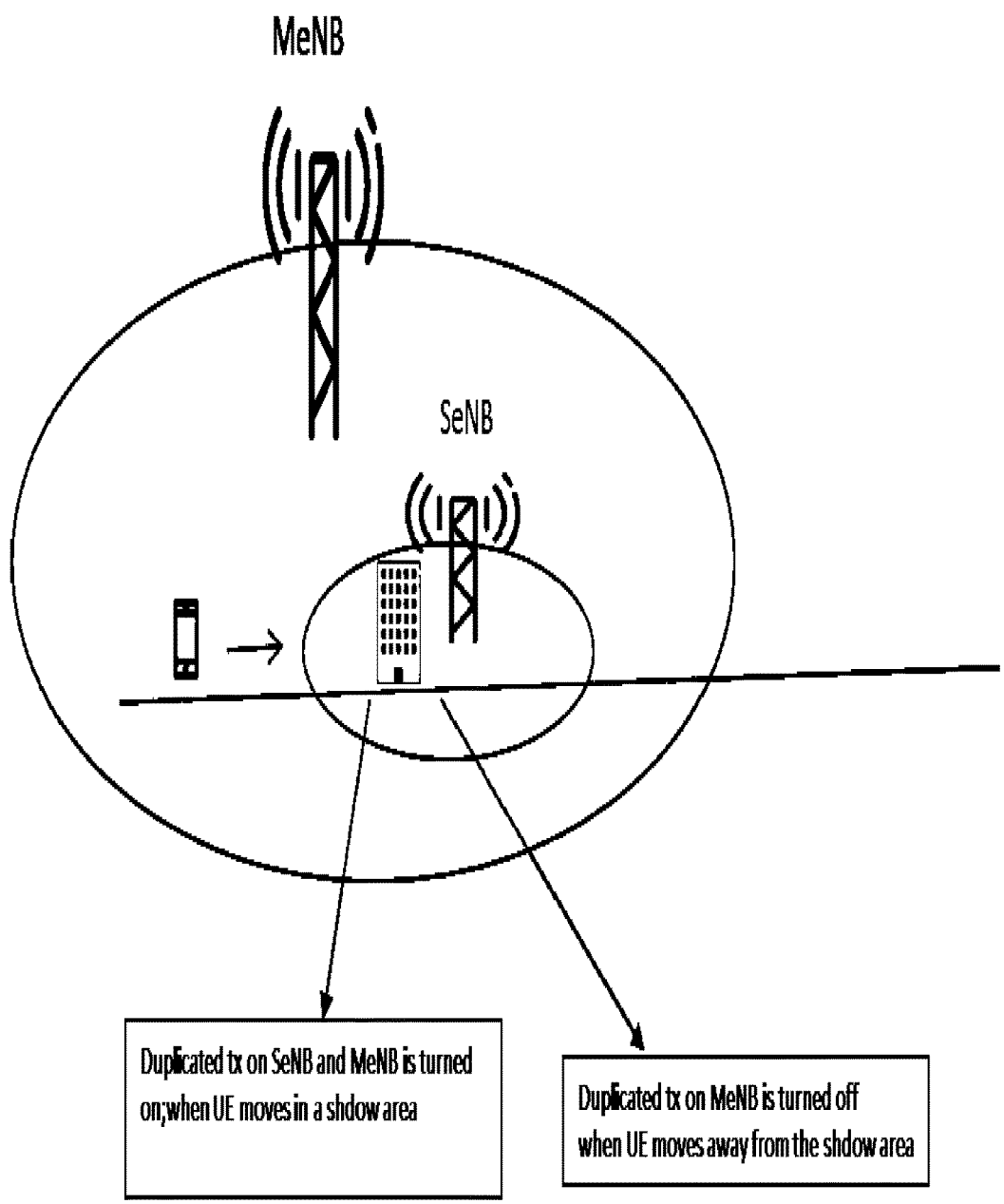

One example where PDCP duplication can be beneficial is when a UE changes its MeNB or one of its SeNBs upon triggering of certain mobility measurement events. In this case the connection to the old node would become worse. This makes the data transmission from the old node unreliable. Duplicated transmission over an unchanged connection would increase the transmission reliability. Duplicated transmission can be switched on before the node change occurs. In this case, potential UP latency reduction may be an additional benefit with duplicated transmission. It is because that the PDCP packet forwarding from the old node to the new node is the typical action during a node switch. Compared to duplicated transmission over the good link, the PDCP packet forwarding would lead to a longer UP latency, since the duplicated transmission can be triggered before the node change. As shown in FIG. 10, the duplicated transmission is switched on at the location B, C and E, when the corresponding measurement event is detected, while it can be turned off later when the node change is finished.

Figure 11:
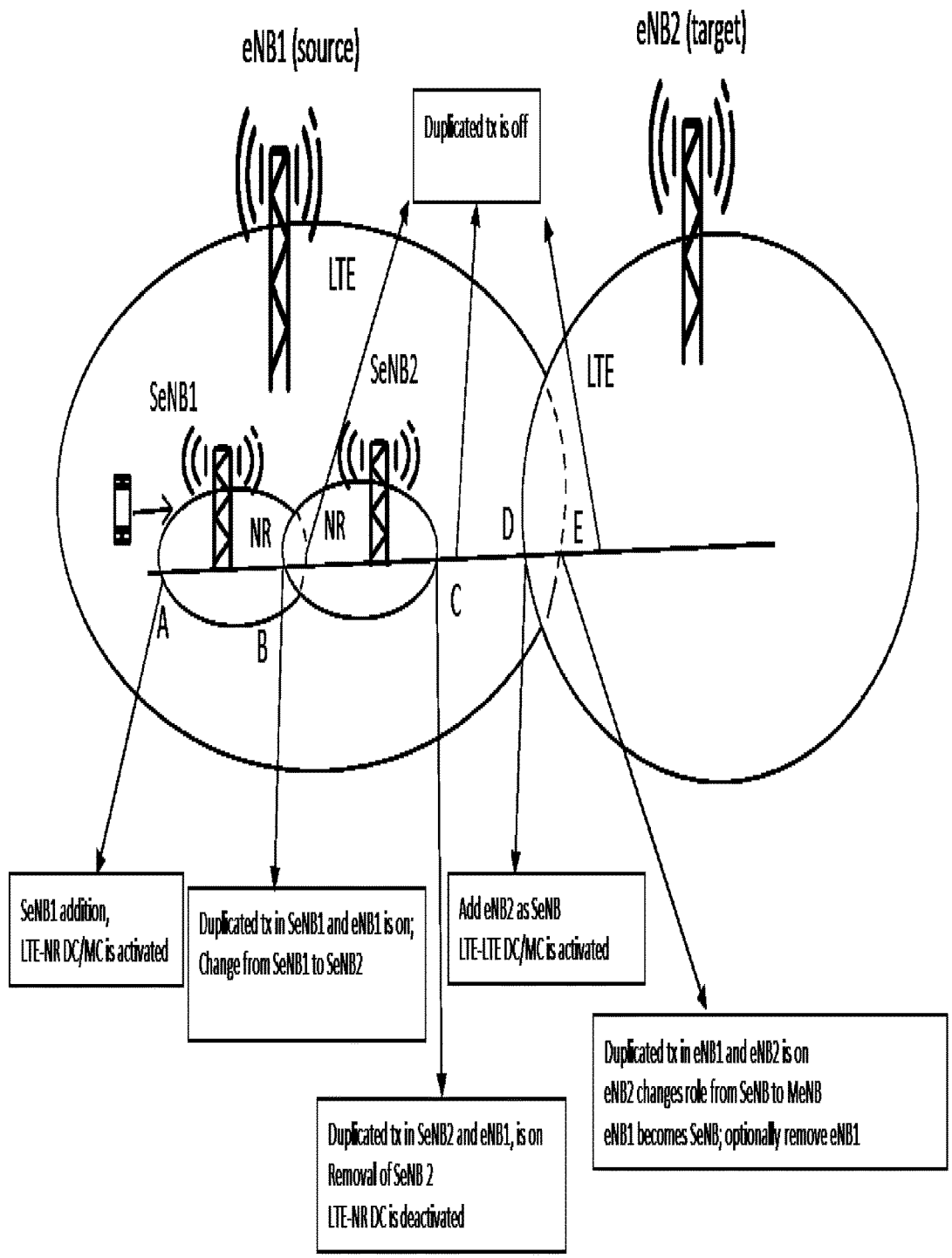

Another example is illustrated in FIG. 11, where a UE moves across a shadow area. The connection to one of the serving nodes is blocked. The duplicated transmission on other un-interrupted connections would help to make sure the transmission reliability. The duplication transmission can according to a particular embodiment of the proposed technology be switched on when UE moves into the area and switched off when UE moves away from the area.

Still another specific example will be given to illustrate the cooperating methods. The example relates to a scenario with a first network node (LTE) and a second network node (5G or NR). Both being connected to a third node, e.g. a User Equipment, UE. The first and second network nodes transmits packets containing different higher layer packets (information) to the third node.

The third node may in a first case measure the connection from first and second network node connection. The third network node informs the first and secondary network node of e.g. the HARQ retransmission rate. A decision may now be taken by the network whether to activate duplication transmission. This may be done based on the HARQ retransmission rate. Assuming that this rate is above a specified threshold from any of the first and second network nodes the first and second network node will transmit duplicate higher layer packets to the third network node.

The duplication transmission may in a second case be triggered by mobility. In such a case the first and second network node transmit packets containing the same information to the third network node if a handover event is triggered by the third network node The duplication transmission where first and second network node transmit packets containing same information to the third network node may also be activated if information SINR is below some threshold from any of the first and second network nodes.

The third network node, the UE, may also request an activation of duplication transmission wherein the third network node signals to the first and second node that the first and second network node are requested to transmit duplicate higher layer packets to the third network node if a particular measurement value indicating the quality on the links is below some threshold.

The duplication transmission may also be triggered based on measurements where the third node measures the variance of the connection from first and second network node connection.

The duplication transmission may also be turned off by utilising the same features as above but in "opposite", i.e. duplication is turned off when the quality is good enough, e.g. as determined by a comparison between a measured value and a threshold value/level.

Having described various embodiments and examples of the proposed methods, in what follows there will be described a number of embodiments of network units, wireless devices and network devices that are configured to perform the earlier described methods. The various devices and units are thus configured to perform the steps of the described methods.

As used herein, the non-limiting terms "wireless device or wireless communication device" and "User Equipment (UE)", may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network unit" or "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Network units (RRUs), or the like.

As used herein, the term "network device" may refer to any device located in connection with a communication network, including but not limited to devices in access networks, core networks and similar network structures. The term network device may also encompass cloud-based network devices.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a wireless device 3 that is configured to enable an activation and/or a deactivation of a packet multiplication/duplication transmission. The wireless device 3 having connections to at least two network units 1; 2. The wireless device 3 is configured to obtain a quality indication representative for the quality of the respective connection between the wireless device 3 and the network units 1; 2. The wireless device 3 is further configured to generate, based on the obtained quality indication, a message comprising information related to the obtained quality that enables the network units to determine whether to activate or deactivate a packet multiplication/duplication transmission mode. The wireless device 3 is further configured to convey the generated message to at least one network unit 1; 2 to enable the network unit to determine whether to activate or deactivate a packet multiplication/duplication transmission mode.

A particular embodiment of the proposed technology provides a wireless device 3 that is configured to enable an activation of packet multiplication/duplication transmission by being configured to convey the generated message to at least one network unit 1; 2 to enable the network unit to determine whether to activate a packet multiplication/duplication transmission mode.

An alternative embodiment of the proposed technology provides a wireless device 3 that is configured to enable a deactivation of packet multiplication/duplication transmission by being configured to convey the generated message to at least one network unit 1; 2 to enable the network unit to determine whether to deactivate a packet multiplication/duplication transmission mode.

A particular embodiment provides a wireless device 3 that is configured to obtain information indicating that the wireless device 3 is subject to a handover.

Another particular embodiment provides a wireless device 3 that is configured to generate a message that instructs the network units to activate a multiplication/duplication transmission mode.

Still another embodiment provides a wireless device 3 that is configured to obtain information by performing measurements providing an indication of the quality of the connection between the wireless device and the respective network units 1; 2.

By way of example, the proposed technology provides a wireless device 3 wherein the indication about the quality of the connection comprises statistics of the Hybrid Automatic Repeat Request, HARQ, retransmission rates.

An optional embodiment of the proposed technology provides a wireless device 3 wherein the statistics of the HARQ retransmission rate comprises the variance of the HARQ retransmission rate.

Another embodiment of the proposed technology provides a wireless device 3 that is configured compare the indication of the quality of the connection to the respective network unit 1; 2 with a specified threshold level and configured to generate a message that instructs the network units 1; 2 to activate a multiplication/duplication transmission mode based on the outcome of the comparison.

Another embodiment of the proposed technology provides a wireless device 3 that is configured compare the indication of the quality of the connection to the respective network unit 1; 2 with a specified threshold level and configured to generate a message that instructs the network units 1; 2 to deactivate a multiplication/duplication transmission mode based on the outcome of the comparison.

The proposed technology also provides a wireless device 3 that is configured to receive an indication that a duplication transmission has been activated. Still another embodiment provides a wireless device 3 that is configured to receive an indication that a duplication transmission has been deactivated.

The proposed technology also provides a wireless device 3 that is configured to activate a packet redundancy procedure if an indication that a duplication transmission has been activated is received.

The proposed technology also provides a wireless device 3 that is configured to enable a deactivation of an ongoing duplication transmission. This is done by generating and conveying the same information as in the case where an activation of the duplication transmission was enabled. By providing the same information the network, i.e. the network unit or the network device, is able to determine, based on the conveyed information, whether to deactivate the ongoing process. The difference between the embodiments relates to the criterion set up during a comparison between a threshold value/level and the conveyed information.

Figure 15A:
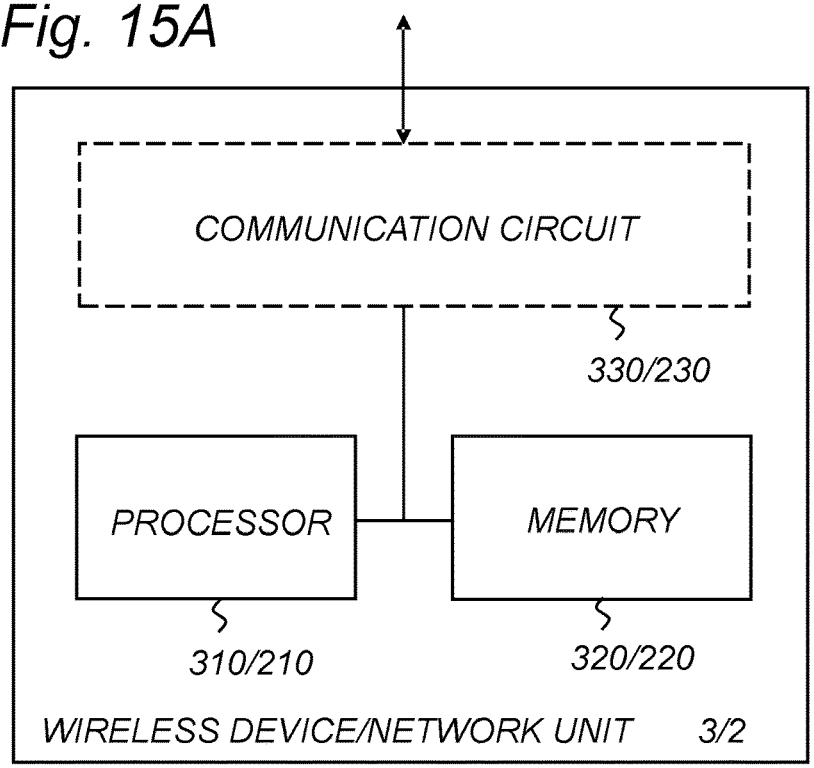
FIG. 15A is a schematic block diagram illustrating a wireless device or a radio unit according to the proposed technology.

FIG. 15A is a schematic block diagram illustrating an example of a wireless device 100, based on a processor-memory implementation according to an embodiment. In this particular example, the arrangement/system 300 comprises a processor 310 and a memory 320, the memory 320 comprising instructions executable by the processor 310, whereby the processor is operative to enable network units to determine whether to activate a packet multiplication/duplication transmission mode.

Figure 16A:
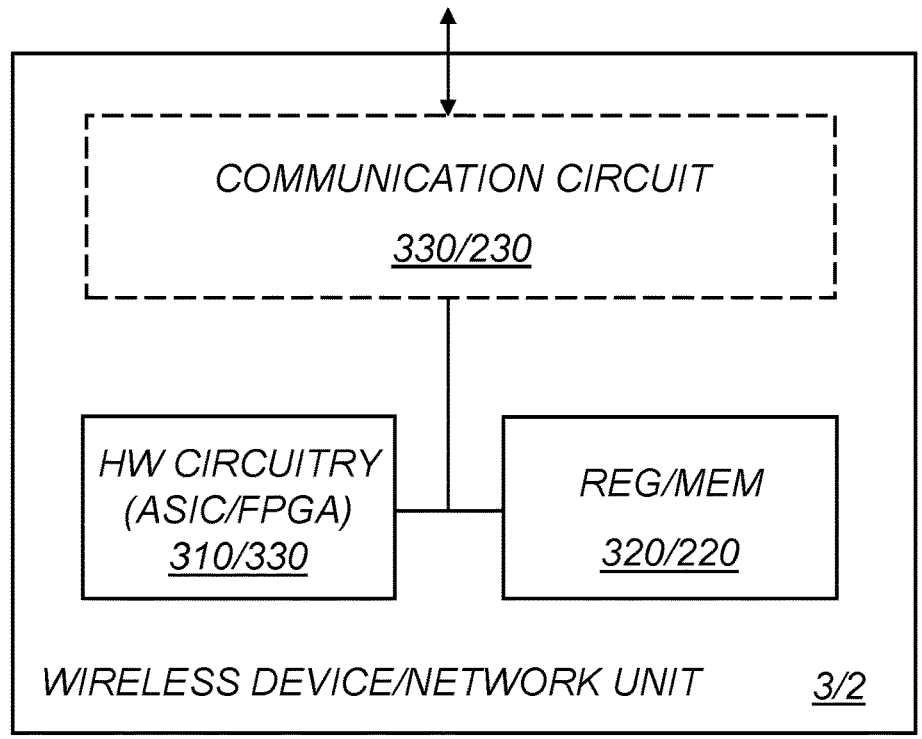
FIG. 16A is a schematic block diagram illustrating a wireless device or a radio unit according to the proposed technology.

FIG. 16A is a schematic block diagram illustrating another example of a wireless device 3, based on a hardware circuitry implementation according to an embodiment. Particular examples of suitable hardware circuitry 310 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 320.

The wireless device may also include a communication circuit 330. The communication circuit 330 may include functions for wired and/or wireless communication with other devices and/or network nodes in the network. In a particular example, the communication circuit 330 may be based on radio circuitry for communication with one or more other nodes, including transmitting and/or receiving information. The communication circuit 330 may be interconnected to the processor 310 and/or memory 320. The communication circuit 330 may be interconnected to the hardware circuitry 310 and/or REG/MEM 320. By way of example, the communication circuit 130 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 17:
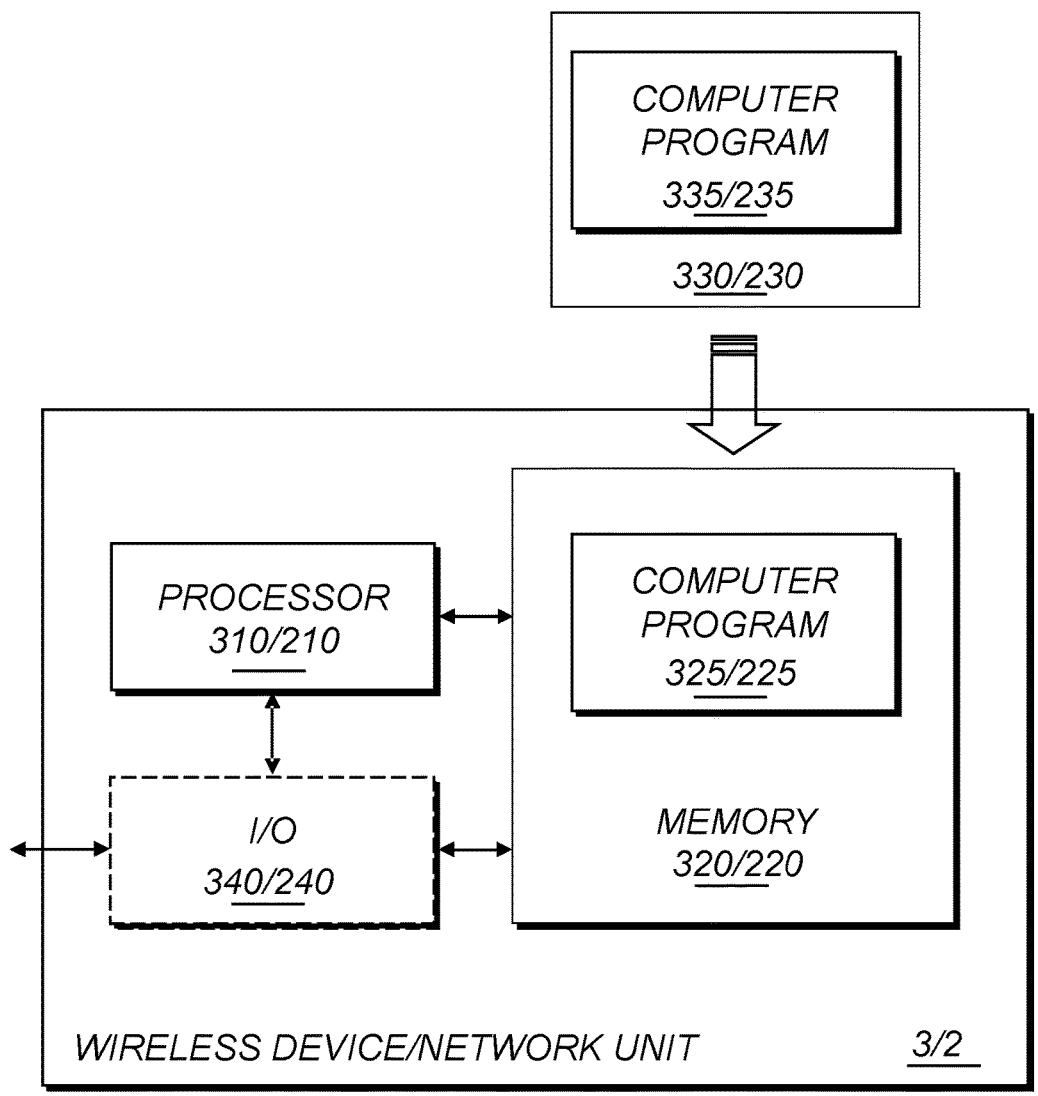

FIG. 17 is a schematic diagram illustrating an example of a computer-implementation according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

According to a particular embodiment of the proposed technology, there is provided a computer program 325; 335 for operating, when executed by a processor 310, a wireless device to enable an activation and/or deactivation of a packet multiplication/duplication transmission, the wireless device 3 having connections to at least two network units 1; 2, wherein the computer program comprises instructions, which when executed by the processor, cause the processor to:

read a quality indication representative for the quality of the respective connection between the wireless device 3 and the network units 1; 2;

generate, based on the read quality indication, a message comprising information related to the obtained quality indication that enables the network units to determine whether to activate or deactivate a packet multiplication/duplication transmission mode;

prepare a transmission of the generated message to at least one network unit 1; 2 to enable the network unit to determine whether to activate or deactivate a packet multiplication/duplication transmission mode where packets are multiplied/duplicated and sent to the wireless device 3 from each of said at least two network units 1; 2.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology also provides a network device that is configured to perform the earlier described method for controlling multiplication/duplication transmissions to a wireless device. To this end there is provided a network device that is configured to control a packet duplication/multiplication transmission to a wireless device 3 having connections to at least two radio units 10; 20, the network device 4 being adapted to coordinate the transmissions to the wireless device 3 from the at least two radio units 1; 2. The network device 4 is configured to receive information indicative of the quality of the connection between the wireless device 3 and each of the at least two radio units 10; 20. The network device 4 is also configured to determine, based on the received information, whether to initiate or terminate a packet multiplication/duplication transmission to the wireless device 3 from the at least two radio units 10; 20. The network device 4 is also configured to initiate or terminate a multiplication/duplication transmission from the radio units 10; 20 to the wireless device 3 if it was determined that such a transmission should be initiated or terminated, respectively.

The proposed technology provides for two distinct possibilities, the network device 4 may comprise one of the at least two radio units 1;2, as schematically illustrated in FIG. 1 or the network device may comprise a central unit communicating with the radio units 1;2. The latter embodiment is schematically illustrated in FIG. 2. Below will follow detailed descriptions of these distinct possibilities.

The proposed technology also provides a computer program which, when executed by a processor operates a network unit to control a packet duplication/multiplication transmission to a wireless device 3 having connections to at least two radio units 10; 20. The computer program comprises instructions, which when executed by the processor, cause the processor to:

read received information indicative of the quality of the connection between the wireless device 3 and each of the at least two radio units 10; 20;

determine, based on the read information, whether to initiate or terminate a packet multiplication/duplication transmission to the wireless device 3 from the at least two radio units 10; 20; and prepare an initiation or a termination of a multiplication/duplication transmission from the radio units 10; 20 to the wireless device 3 if it is determined that such a transmission should be initiated or terminated, respectively.

The computer program may be utilized by either the network device 4, as schematically shown in FIG. 2, or a radio unit 10; 20 as shown schematically by FIG. 1. Details of the particular computer programs will be provided in what follows.

According to a specific embodiment of the proposed technology there is provided a network unit 1 for controlling a packet duplication/multiplication transmission to a wireless device 3 having connections to the network unit 1 and at least one more network unit 2. The network unit 1 is configured to receive information indicative of the quality of the connection between the wireless device 3 and each of the at least two radio units 10; 20. The network unit 1 is also configured to determine, based on the received information, whether to initiate or terminate a packet multiplication/duplication transmission to the wireless device 3 from the at least two radio units 10; 20. The network unit 1 is also configured to initiate or terminate a multiplication/duplication transmission from the radio units 10; 20 to the wireless 3 if it is determined that such a transmission should be initiated or terminated.

According to a particular embodiment of the proposed technology there is provide a network unit 1 that is configured to deactivate an ongoing duplication transmission. This may be done by generating and conveying the same information as in the case where an activation of the duplication transmission was enable. By providing the same information the network, i.e. the network unit or the network device, is able to determine based on the conveyed information whether to deactivate the ongoing process. The difference relates to the criterion set up during a comparison between a threshold value/level and the conveyed information.

According to an optional embodiment the network unit 1 may also be configured to transmit information to the wireless device 3 to acknowledge the outcome of the procedure, i.e. whether a duplication transmission was activated or not. At least for the case where a duplication transmission was activated.

FIG. 15A is a schematic block diagram illustrating an example of a network unit 1, based on a processor-memory implementation according to an embodiment. In this particular example, the network unit 1 comprises a processor 110 and a memory 120, the memory 120 comprising instructions executable by the processor 110, whereby the processor is operative to control packet duplication/multiplication transmission to a wireless device.

FIG. 16A is a schematic block diagram illustrating another example of a network unit 100, based on a hardware circuitry implementation according to an embodiment. Particular examples of suitable hardware circuitry 110 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 120.

Optionally, the network unit 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. The communication circuit 130 may be interconnected to the hardware circuitry 110 and/or REG/MEM 120. By way of example, the communication circuit 130 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

FIG. 17 is a schematic diagram illustrating an example of a computer-implementation according to an embodiment. In this particular example, at least some of the steps, functions, procedures, modules and/or blocks described herein are implemented in a computer program 125; 135, which is loaded into the memory 120 for execution by processing circuitry including one or more processors 110. The processor(s) 110 and memory 120 are interconnected to each other to enable normal software execution. An optional input/output device 140 may also be interconnected to the processor(s) 110 and/or the memory 120 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 110 is thus configured to perform, when executing the computer program 125, well-defined processing tasks such as those described herein.

The processing circuitry does not have to be dedicated to only execute the above-described steps, functions, procedure and/or blocks, but may also execute other tasks.

According to a particular embodiment of the proposed technology there is provided a computer program 125; 135 for operating, when executed by a processor 110, a network unit 1 to control a packet duplication/multiplication transmission to a wireless device 3 having connections to the network unit 1 and at least one more network unit 2, wherein the computer program comprises instructions, which when executed by the processor 110, cause the processor to:
  read received information indicative of the quality of the connection between the wireless device 3 and each of the at least two radio units 10; 20;
  determine, based on the read information, whether to initiate or terminate a packet multiplication/duplication transmission to the wireless device 3 from the at least two radio units 10; 20; and
  prepare an initiation or termination of a duplication transmission from the radio units 10; 20 to the wireless 3 if it is determined that such a transmission should be initiated or terminated.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 125; 135 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

According to another specific embodiment of the proposed technology there is provided a network device 4 configured to control a packet duplication/multiplication transmission to a wireless device 3 having connections to at least two radio units 10; 20. The network device 4 being adapted to coordinate the transmissions to the wireless device 3 from the at least two radio units 1; 2. The network device 4 is configured to receive information indicative of the quality of the connection between the wireless device 3 and each of the at least two radio units 10; 20. The network device 4 is also configured to determine, based on the received information, whether to initiate or terminate a packet multiplication/duplication transmission to the wireless device 3 from the at least two radio units 10; 20. The network device 4 is also configured to initiate or terminate a duplication transmission from the radio units 10; 20 to the wireless 3 if it was determined that such a transmission should be initiated or terminated.

The network device may be any suitable network device in the wireless communication system, or a network device in connection with the wireless communication system. By way of example, the network device may be a suitable network node such a base station or an access point. However, the network device may alternatively be a cloud-implemented network device.

According to an optional embodiment the network device may also be configured to convey information to the wireless device 3 to acknowledge the outcome of the procedure, i.e. whether a multiplication/duplication transmission was activated or not. This may be done at least for the case where a multiplication/duplication transmission was activated.

According to an embodiment of the proposed technology there is provided a network device that is configured to deactivate an ongoing multiplication/duplication transmission. This may be done by generating and conveying the same information as in the case where an activation of the multiplication/duplication transmission was enabled. By providing the same information the network, i.e. the network unit or the network device, is able to determine based on the conveyed information whether to deactivate the ongoing process. The difference relates to the criterion set up during a comparison between a threshold value/level and the conveyed information.

Figure 15B:
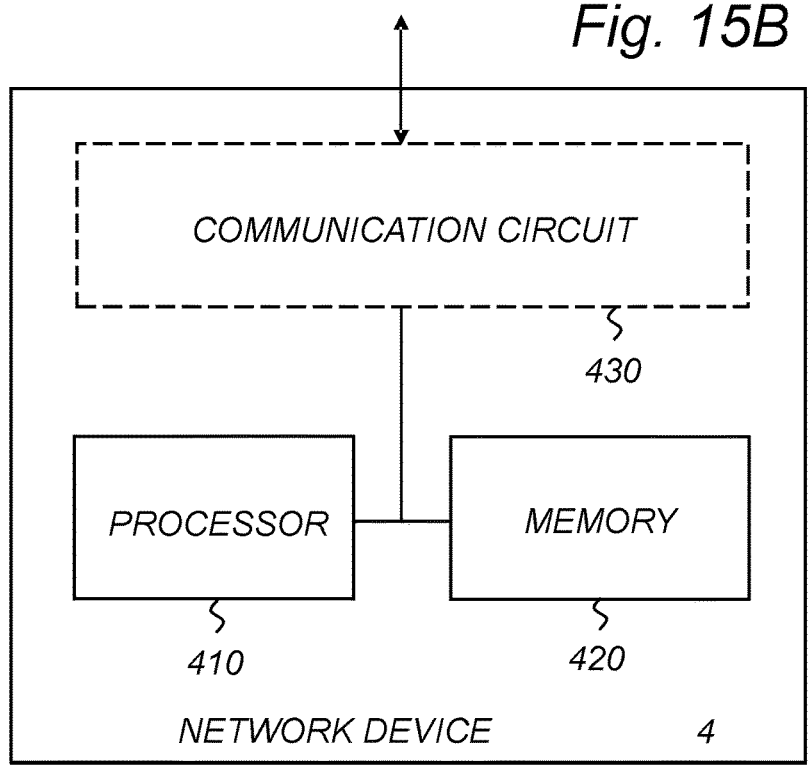
FIG. 15B is a schematic block diagram illustrating a network device according to the proposed technology

FIG. 15B is a schematic block diagram illustrating an example of a network device 4, based on a processor-memory implementation according to an embodiment. In this particular example, the network device 4 comprises a processor 410 and a memory 420, the memory 420 comprising instructions executable by the processor 410, whereby the processor is operative to control packet duplication/multiplication transmission to a wireless device.

Figure 16B:
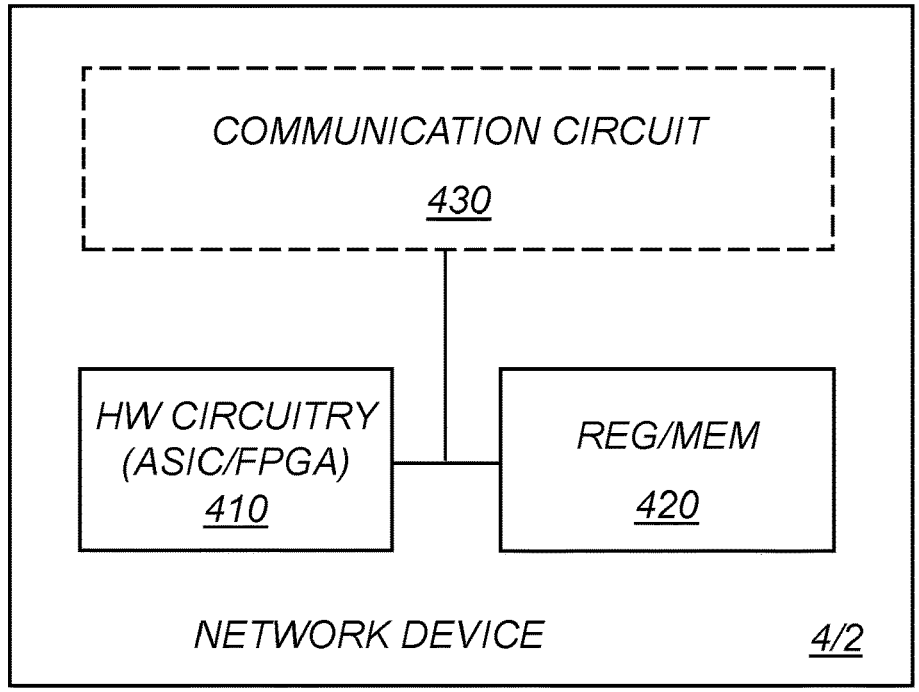
FIG. 16B is a schematic block diagram illustrating a network device according to the proposed technology

FIG. 16B is a schematic block diagram illustrating another example of a network device 4, based on a hardware circuitry implementation according to an embodiment. Particular examples of suitable hardware circuitry 410 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 420.

Optionally, the network device 4 may also include a communication circuit 430. The communication circuit 430 may include functions for wired and/or wireless communication with other devices and/or network nodes in the network. In a particular example, the communication circuit 430 may be based on radio circuitry for communication with one or more other nodes, including transmitting and/or receiving information. The communication circuit 430 may be interconnected to the processor 410 and/or memory 420. The communication circuit 430 may be interconnected to the hardware circuitry 410 and/or REG/MEM 420. By way of example, the communication circuit 430 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 18:
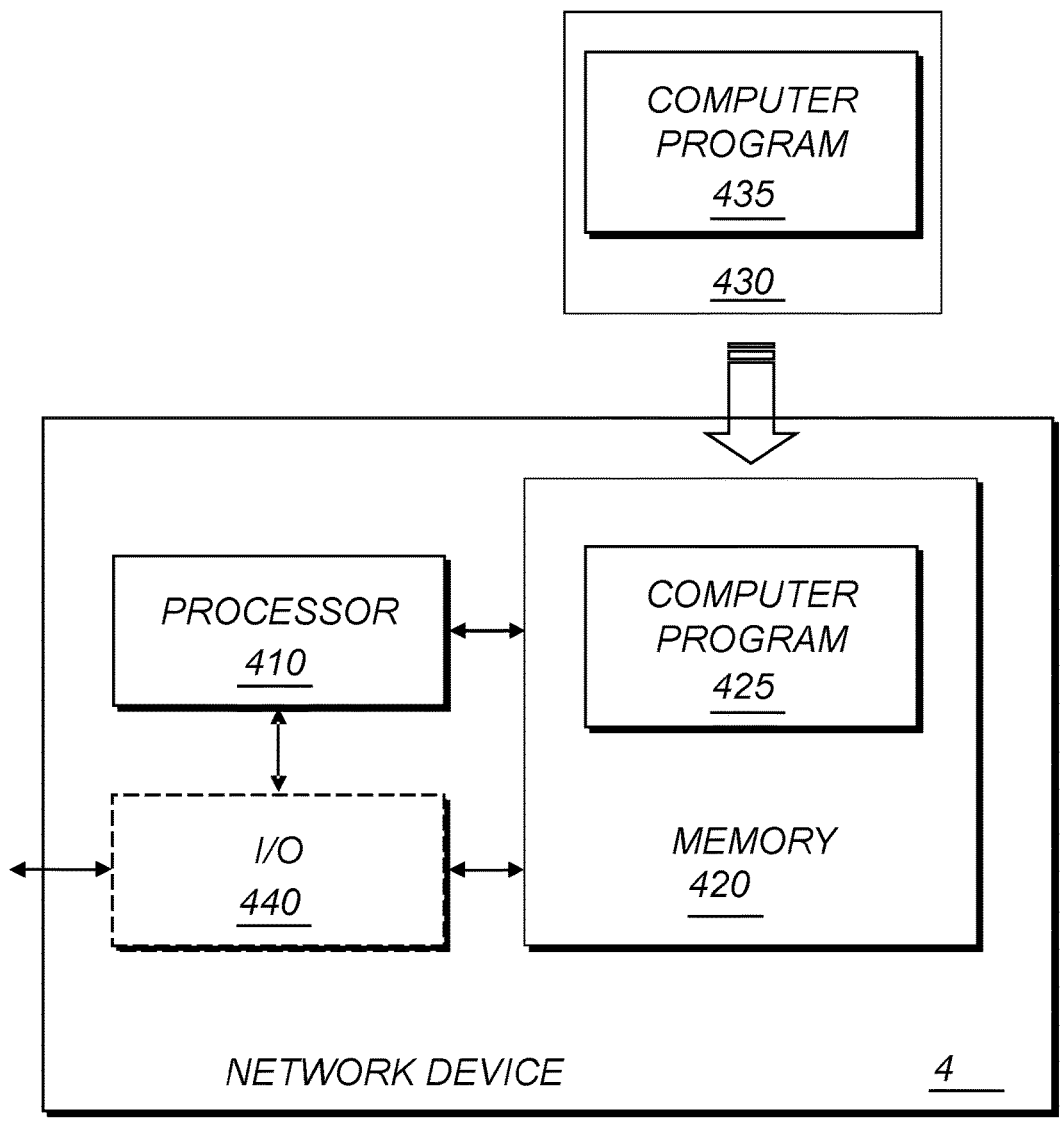

FIG. 18 is a schematic diagram illustrating an example of a computer-implementation according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 125, well-defined processing tasks such as those described herein.

The processing circuitry does not have to be dedicated to only execute the above-described steps, functions, procedure and/or blocks, but may also execute other tasks.

According to a particular embodiment of the proposed technology there is provided a computer program 425 for operating, when executed by a processor 410, a network device 4 to control a packet duplication/multiplication transmission to a wireless device having connections to at least two radio units 10; 20, the network device 4 being adapted to coordinate the transmissions to the wireless device 3 from the at least two radio units 1; 2, wherein the computer program comprises instructions, which when executed by the processor, cause the processor to:

read received information indicative of the quality of the connection between the wireless device 3 and each of the at least two radio units 10; 20;

determine, based on the read information, whether to initiate or terminate a packet multiplication/duplication transmission to the wireless device 3 from the at least two radio units 10; 20; and prepare an initiation or termination of a multiplication/duplication transmission from the radio units 10; 20 to the wireless 3 if it is determined that such a transmission should be initiated or terminated.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 125; 135 may be realized as a computer program product, which is normally carried or stored on a computer-readable medium 120; 130, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 19:
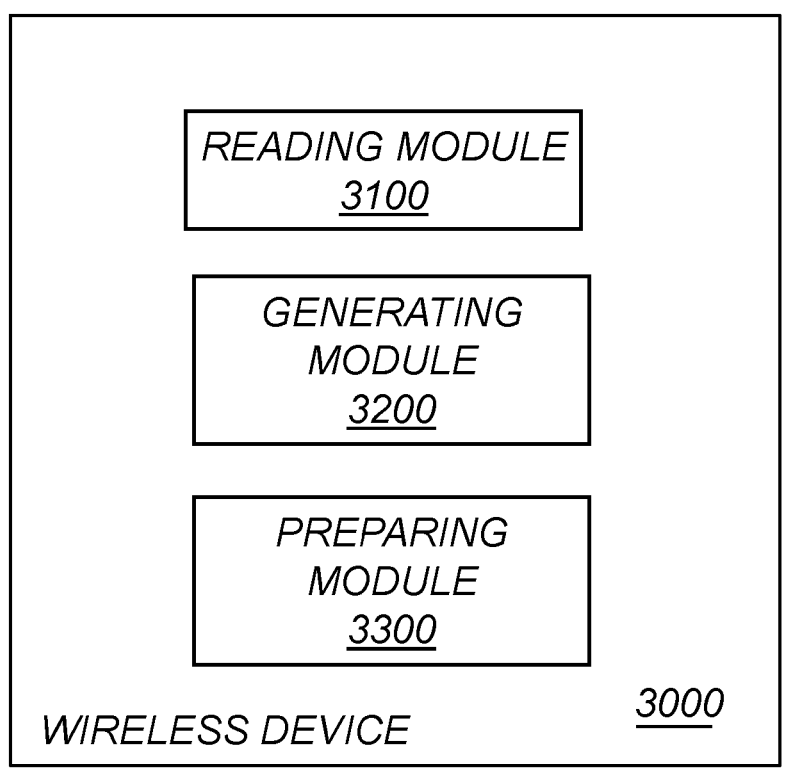

FIG. 19 is a schematic diagram illustrating an example of an apparatus 3000 for controlling a wireless device to enable an activation and/or deactivation of a packet multiplication/duplication transmission, the wireless device 3 having connections to at least two network units 1; 2. The apparatus comprises a reading module 3100 for reading a quality indication representative for the quality of the respective connection between the wireless device 3 and the network units 1; 2. The apparatus also comprises a generating module 3200 for generating, based on the read quality indication, a message comprising information related to the obtained quality that enables the network units to determine whether to activate or deactivate a packet multiplication/duplication transmission mode. The apparatus also comprises a preparing module 3300 for preparing a transmission of the generated message to at least one network unit 1; 2 to enable the network unit to determine whether to activate or deactivate a packet multiplication/duplication transmission mode where packets are multiplied/duplicated and sent to the wireless device 3 from each of the at least two network units 1; 2.

Figure 20:
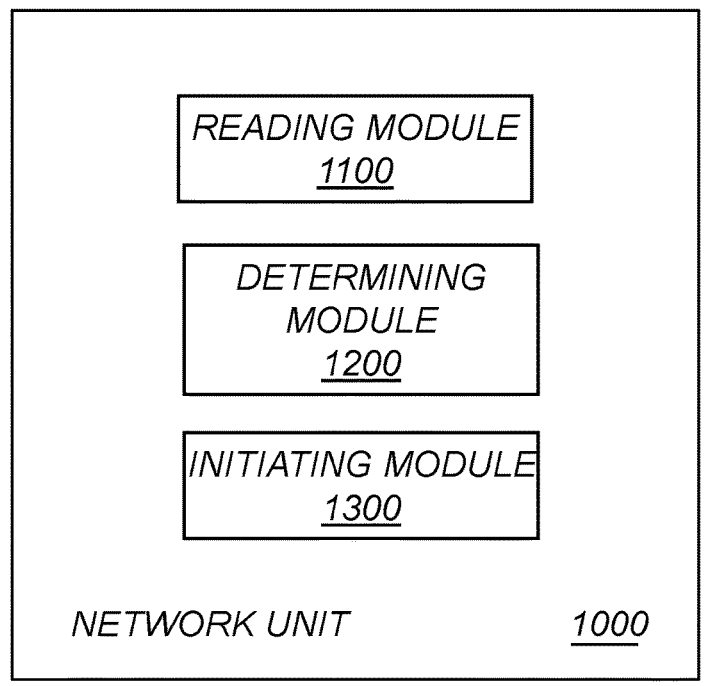

FIG. 20 is a schematic diagram illustrating an example of an apparatus 1000 for controlling a network unit 1 to control a multiplication/duplication transmission to a wireless device 3 having connections to the network unit 1 and at least one more network unit 2. The apparatus comprises a reading module 1100 for reading received information indicative of the quality of the connection between the wireless device 3 and each of the at least two radio units 10; 20. The apparatus also comprises a determining module for determining, based on the read information, whether to initiate or terminate a packet multiplication/duplication transmission to the wireless device 3 from the at least two radio units 10; 20. The apparatus further comprises a preparing module for preparing an initiation or termination of a multiplication/duplication transmission from the radio units 10; 20 to the wireless 3 if it is determined that such a transmission should be initiated or terminated.

Figure 21:
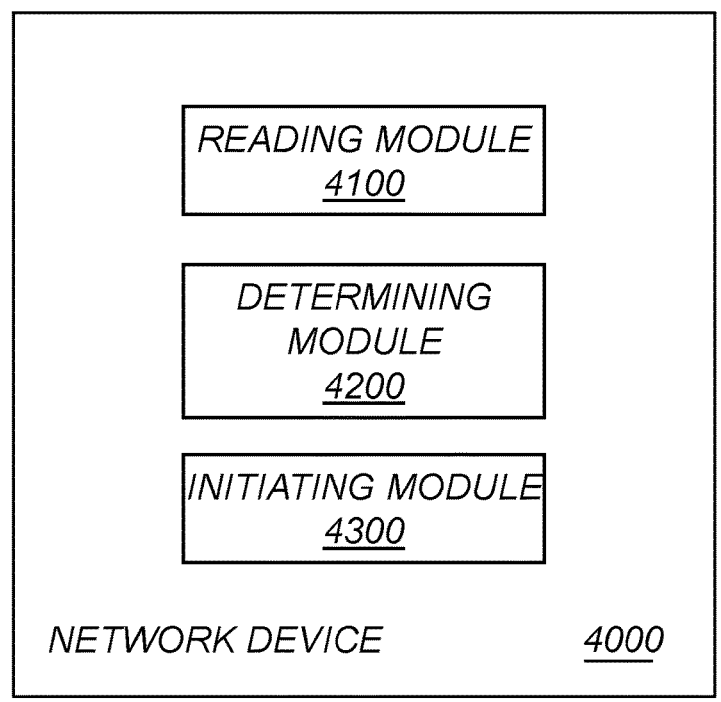

FIG. 21 is a schematic diagram illustrating an example of an apparatus 4000 for controlling a network device 4 to control a packet duplication/multiplication transmission to a wireless device 3 having connections to at least two radio units 10; 20, the network device 4 being adapted to coordinate the transmissions to the wireless device 3 from the at least two radio units 1; 2. The apparatus comprises a reading module 4100 for reading received information indicative of the quality of the connection between the wireless device 3 and each of the at least two radio units 10; 20. The apparatus also comprises a determining module 4200 for determining, based on the read information, whether to initiate or terminate a packet multiplication/duplication transmission to the wireless device 3 from the at least two radio units 10; 20. The apparatus also comprises a preparing module 4300 for preparing an initiation or termination of a multiplication/duplication transmission from the radio units 10; 20 to the wireless 3 if it is determined that such a transmission should be initiated or terminated.

Alternatively it is possible to realize the module(s) in FIGS. 19, 20 and 21 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services. At least the network device 4 as described herein may be implemented in these contexts.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (Nis), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method performed by a wireless device operating in a communication network, the method comprising:
   determining a Hybrid Automatic Repeat reQuest (HARQ) statistic for user-plane data transmissions on connections between the wireless device and at least two radio network nodes of the communication network, the HARQ statistic comprising a HARQ retransmission rate on each of the connections or a variance in the HARQ retransmission rate across the respective connections; and
   transmitting signaling to at least one of the radio network nodes, indicating the HARQ statistic, for use by the communication network in deciding whether to activate or deactivate a packet multiplication mode of operation between the wireless device and the at least two radio network nodes;
   wherein duplicate Packet Data Convergence Protocol (PDCP) Protocol Data Units (PDUs) are transmitted across the respective connections when the packet multiplication mode of operation is activated, and wherein duplication of PDCP PDUs across the respective connections is not used when the packet multiplication mode is deactivated.

2. The method according to claim 1, wherein transmitting the signaling comprises conditionally transmitting the signaling in dependence on whether the HARQ statistic exceeds a specified threshold value.

3. A method performed by a network device configured for operation in a communication network, the method comprising:
   determining a Hybrid Automatic Repeat reQuest (HARQ) statistic for user-plane data transmissions on connections between a wireless device and at least two radio network nodes of the communication network, the HARQ statistic comprising a HARQ retransmission rate on each of the connections or a variance in the HARQ retransmission rate across the respective connections; and
   deciding whether to activate or deactivate a packet multiplication mode of operation between the wireless device and the at least two radio network nodes, in dependence on the HARQ statistic;
   wherein duplicate Packet Data Convergence Protocol (PDCP) Protocol Data Units (PDUs) are transmitted across the respective connections when the packet multiplication mode of operation is activated, and wherein duplication of PDCP PDUs across the respective connections is not used when the packet multiplication mode is deactivated.

4. The method according to claim 3, wherein the method further comprises signaling, to the wireless device, whether said packet multiplication mode of operation has been initiated or terminated.

5. The method according to claim 3, wherein the network device is communicatively coupled to the at least two radio network nodes, for controlling the activation and deactivation of the packet multiplication mode of operation, or wherein the network device comprises one of the at least two radio network nodes, for controlling activation and deactivation of the packet multiplication mode of operation.

6. The method according to claim 3, wherein deciding whether to activate or deactivate the packet multiplication mode of operation between the wireless device and the at least two radio network nodes comprises activating the packet multiplication mode of operation if the HARQ statistic exceeds a threshold value, and deactivating the packet multiplication mode of operation if the HARQ statistic falls below the same or another threshold value.

7. The method of claim 3, wherein determining the HARQ statistic comprises the network device determining the HARQ statistic based on the network device tracking HARQ retransmissions on the connections between the at least two radio network nodes and the wireless device, or based on the network device receiving signaling indicating the HARQ statistic, wherein the signaling originates from any one or more of the at least two network nodes and the wireless device.

8. A wireless device configured for operation in a communication network, the wireless device comprising:
   communication circuitry configured for transmitting signals to and receiving signals from one or more radio network nodes of the communication network; and
   processing circuitry operatively associated with the communication circuitry and configured to:
      determine a Hybrid Automatic Repeat reQuest (HARQ) statistic for user-plane data transmissions on connections between the wireless device and at least two radio network nodes of the communication network, the HARQ statistic comprising a HARQ retransmission rate on each of the connections or a variance in the HARQ retransmission rate across the respective connections; and
      transmit signaling to at least one of the radio network nodes, indicating the HARQ statistic, for use by the communication network in deciding whether to activate or deactivate a packet multiplication mode of operation between the wireless device and the at least two radio network nodes;
   wherein duplicate Packet Data Convergence Protocol (PDCP) Protocol Data Units (PDUs) are transmitted across the respective connections when the packet multiplication mode of operation is activated, and wherein duplication of PDCP PDUs across the respective connections is not used when the packet multiplication mode is deactivated.

9. A network device configured for operation in a communication network, the network device comprising:
   communication circuitry configured for transmitting signaling for activating and deactivating a packet multiplication mode of operation; and
   processing circuitry operatively associated with the communication circuitry and configured to:
      determine a Hybrid Automatic Repeat reQuest (HARQ) statistic for user-plane data transmissions on connections between a wireless device and at least two radio network nodes of the communication network, the HARQ statistic comprising a HARQ retransmission rate on each of the connections or a variance in the HARQ retransmission rate across the respective connections; and
      decide whether to activate or deactivate the packet multiplication mode of operation, as between the wireless device and the at least two radio network nodes, in dependence on the HARQ statistic;
   wherein duplicate Packet Data Convergence Protocol (PDCP) Protocol Data Units (PDUs) are transmitted across the respective connections when the packet multiplication mode of operation is activated, and wherein duplication of PDCP PDUs across the respective connections is not used when the packet multiplication mode is deactivated.

10. The network device according to claim 9, wherein the network device comprises one of the radio network nodes.

11. The network device of claim 9, wherein the processing circuitry is configured to determine the HARQ statistic based on the network device tracking HARQ retransmissions on the connections between the at least two radio network nodes and the wireless device, or based on the network device receiving signaling indicating the HARQ statistic, wherein the signaling originates from any one or more of the at least two network nodes and the wireless device.

* * * * *